(12) United States Patent
Wallack et al.

(10) Patent No.: US 10,803,622 B2
(45) Date of Patent: Oct. 13, 2020

(54) HIGH SPEED STRUCTURED LIGHT SYSTEM

(71) Applicant: Cognex Corporation, Natick, MA (US)

(72) Inventors: Aaron Wallack, Natick, MA (US);
John Filhaber, East Haddam, CT (US);
George Costigan, Tyngsboro, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/422,693

(22) Filed: May 24, 2019

(65) Prior Publication Data
US 2020/0020130 A1    Jan. 16, 2020

Related U.S. Application Data

(63) Continuation of application No. 15/446,316, filed on Mar. 1, 2017, now Pat. No. 10,360,693.

(51) Int. Cl.
| | |
|---|---|
| *G06K 9/00* | (2006.01) |
| *G06T 7/80* | (2017.01) |
| *G06T 7/521* | (2017.01) |
| *G01B 11/25* | (2006.01) |
| *H04N 9/00* | (2006.01) |

(52) U.S. Cl.
CPC ............ *G06T 7/80* (2017.01); *G01B 11/2527* (2013.01); *G06T 7/521* (2017.01); *H04N 9/00* (2013.01)

(58) Field of Classification Search
CPC ....... G06T 7/80; G06T 7/521; G01B 11/2527; H04N 9/00
See application file for complete search history.

(56) References Cited

U.S. PATENT DOCUMENTS

| | | | |
|---|---|---|---|
| 6,025,905 A | 2/2000 | Sussman | |
| 6,222,935 B1 | 4/2001 | Okamoto | |
| 7,009,718 B2 * | 3/2006 | Fujita | G01B 11/25 356/604 |
| 7,353,954 B1 | 4/2008 | Malek et al. | |

(Continued)

OTHER PUBLICATIONS

Tsai, A Versatile Camera Calibration Technique for High-Accuracy 3D Machine Vision Metrology Using Off-the-shelf TV Cameras and Lenses. IEEE Journal of Robotics and Automation. Aug. 1987; RA-3(4):323-44.

*Primary Examiner* — Gregory M Desire
(74) *Attorney, Agent, or Firm* — Wolf, Greenfield & Sacks, P.C.

(57) ABSTRACT

The present disclosure provides a high resolution structured light system that is also capable of maintaining high throughput. The high resolution structured light system includes one or more image capture devices, such as a camera and/or an image sensor, a projector, and a blurring element. The projector is configured to project a binary pattern so that the projector can operate at high throughput. The binary projection pattern is subsequently filtered by the blurring element to remove high frequency components of the binary projection pattern. This filtering smoothes out sharp edges of the binary projection pattern, thereby creating a blurred projection pattern that changes gradually from the low value to the high value. This gradual change can be used by the structured light system to resolve spatial changes in the 3D profile that could not otherwise be resolved using a binary pattern.

20 Claims, 28 Drawing Sheets

(56) References Cited

U.S. PATENT DOCUMENTS

| | | | |
|---|---|---|---|
| 7,545,516 B2* | 6/2009 | Jia | G01B 11/2527 |
| | | | 356/602 |
| 7,953,287 B2 | 5/2011 | Drimbarean et al. | |
| 8,538,726 B2 | 9/2013 | Yoshikawa et al. | |
| 8,811,767 B2 | 8/2014 | Veeraraghavan et al. | |
| 9,427,238 B2 | 8/2016 | Hopman et al. | |
| 9,689,668 B2* | 6/2017 | Sonoda | G01B 11/2513 |
| 9,774,837 B2 | 9/2017 | Chang et al. | |
| 10,360,693 B2* | 7/2019 | Wallack | G06T 7/80 |
| 2005/0206738 A1 | 9/2005 | Kumaki et al. | |
| 2006/0017720 A1* | 1/2006 | Li | G06T 17/10 |
| | | | 345/419 |
| 2007/0115484 A1 | 5/2007 | Huang et al. | |
| 2009/0322859 A1* | 12/2009 | Shelton | G01B 11/2513 |
| | | | 348/46 |
| 2011/0080471 A1 | 4/2011 | Song et al. | |
| 2012/0293700 A1* | 11/2012 | Drouin | G02B 3/06 |
| | | | 348/333.1 |
| 2015/0292863 A1* | 10/2015 | Furihata | G06T 7/593 |
| | | | 348/135 |
| 2015/0371393 A1 | 12/2015 | Ramachandra et al. | |
| 2017/0085860 A1 | 3/2017 | Zhang et al. | |
| 2018/0101962 A1* | 4/2018 | Takizawa | G01B 11/2513 |
| 2018/0253863 A1 | 9/2018 | Wallack et al. | |
| 2018/0372484 A1* | 12/2018 | Fujita | G01B 11/25 |
| 2019/0122378 A1* | 4/2019 | Aswin | G06N 3/0418 |

* cited by examiner

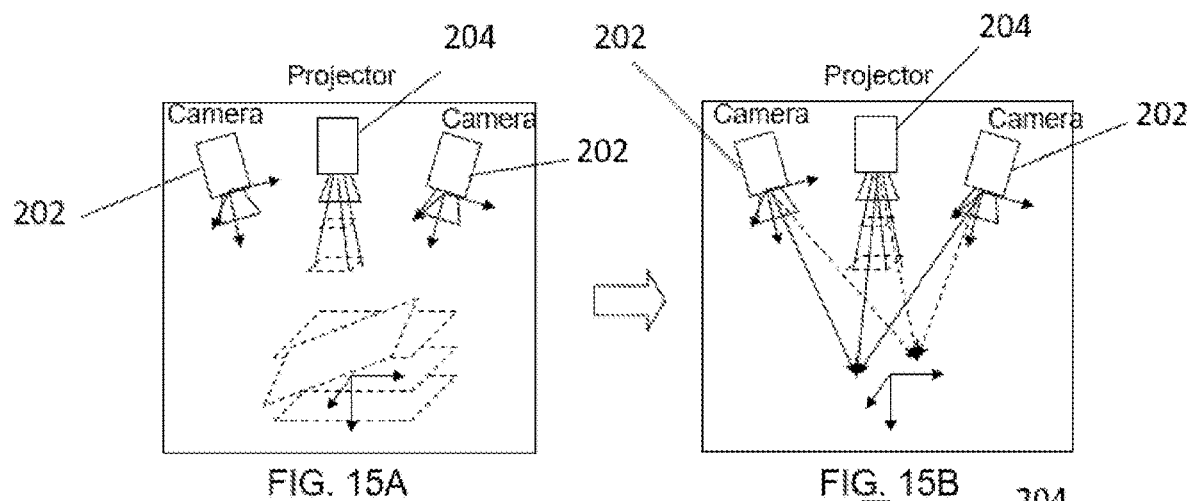
FIG. 15A
FIG. 15B
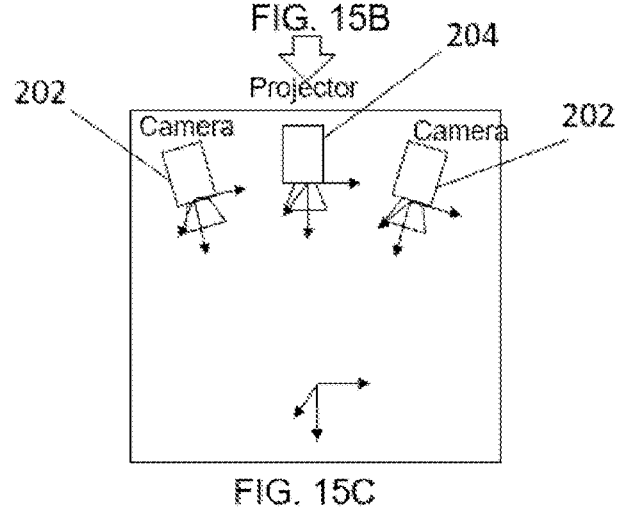
FIG. 15C

HIGH SPEED STRUCTURED LIGHT SYSTEM

CROSS REFERENCE TO RELATED APPLICATIONS

This Application is a Continuation of U.S. patent application Ser. No. 15/446,316, filed Mar. 1, 2017, entitled "HIGH SPEED STRUCTURED LIGHT SYSTEM." The entire content of this application is incorporated herein by reference in its entirety.

TECHNICAL FIELD

Disclosed apparatus, systems, and computerized methods relate generally to a projector vision system and, more specifically, to calibrating a projector vision system.

BACKGROUND

In machine vision systems, one or more image capture devices can be used to perform vision system processes on an object or surface within an imaged scene. These processes can include inspection, image/symbol decoding, object alignment, and/or a variety of other tasks. In some applications, a machine vision system can be used to inspect a work piece disposed within or passing through an imaged scene. The scene can be imaged by one or more image capture devices. The images captured by the one or more image capture devices can be processed by the machine vision system to determine information about features within the imaged scene, such as the features' real-world locations, poses, etc. In some applications, the one or more image capture devices can be calibrated to allow the machine vision system to perform vision tasks with increased accuracy and reliability.

Some machine visions systems include a structured light system. A structured light system includes one or more image capture devices and a projector system. The projector system can be configured to project a particular pattern onto an object of interest, and the object of interest can be imaged by the one or more image capture devices. Based on the difference between the projected pattern and the pattern captured by the one or more image capture devices, the structured light system can determine a three-dimensional profile of the object of interest. In some applications, the one or more image capture devices and the projector system can be co-calibrated to allow the machine vision system to perform vision tasks with increased accuracy and reliability.

SUMMARY

Some embodiments of the disclosed subject matter include a structured light system. The structured light system includes a projector configured to generate a projection pattern including a first plurality of intensity levels, and an optical element in a light path between the projector and a plane of interest, wherein the optical element is configured to blur the projection pattern to provide a blurred projection pattern onto the plane of interest, wherein the blurred projection pattern includes a second plurality of intensity levels, wherein the second plurality is greater than the first plurality. The structured light system can also include one or more image capture devices configured to capture an image of the blurred projection pattern projected onto the plane of interest.

Some embodiments of the disclosed subject matter include a method. The method includes generating, using a projector, a projection pattern including a first plurality of intensity levels, and projecting the projection pattern into an optical element in a light path between the projector and a plane of interest to blur the projection pattern into a blurred projection pattern and to project the blurred projection pattern onto the plane of interest, wherein the blurred projection pattern includes a second plurality of intensity levels, wherein the second plurality is greater than the first plurality. The method also includes capturing an image of the blurred projection pattern projected onto the plane of interest using one or more image capture devices.

In some embodiments, the projection pattern including the first plurality of intensity levels includes a binary projection pattern including a first intensity level and a second intensity level.

In some embodiments, the binary projection pattern includes a periodic square-wave pattern having a sharp edge between the first intensity level and the second intensity level.

In some embodiments, the blur element is configured to blur the sharp edge between the first intensity level and the second intensity level to provide the blurred projection pattern comprising a sinusoidal projection pattern.

In some embodiments, the blur element is configured to modify a spatial frequency content of the projection pattern to provide the blurred projection pattern with a relatively uniform modulation transfer function.

In some embodiments, the blur element includes an optical device that is configured to create, from the projection pattern, a plurality of spatially-shifted projection patterns and to super-impose the plurality of spatially-shifted projection patterns to provide the blurred projection pattern.

In some embodiments, the blur element comprises a micro prism configured to provide spatial displacement of the projection pattern.

In some embodiments, the blur element comprises a micro lens array to provide spatial displacement of the projection pattern.

In some embodiments, the blur element comprises a continuous axis-symmetric polynomial surface configured to create a plurality of spatially-shifted projection patterns displaced along the optical axis.

In some embodiments, the blur element comprises a Fresnel surface with multiple focal zones displaced along the optical axis.

In some embodiments, the projector is configured to generate a first periodic projection pattern and a second periodic projection pattern, wherein the second periodic projection pattern is phase-shifted from the first periodic projection pattern.

In some embodiments, the blur element is configured to provide, from the first projection pattern, a first blurred periodic projection pattern, and to provide, from the second projection pattern, a second blurred periodic projection pattern.

In some embodiments, the one or more image capture devices are configured to capture a first image of the first blurred periodic projection pattern and a second image of the second blurred periodic projection pattern.

In some embodiments, the structured light system includes a processor configured to run a computer program stored in memory that is configured to cause the processor to determine a correspondence between an image coordinate system and a projector coordinate system.

In some embodiments, the method includes determining a correspondence between an image coordinate system and a projector coordinate system.

In some embodiments, the processor is configured to determine, for an image pixel element in the first image, a phase of the first blurred periodic projection pattern at the image pixel element.

In some embodiments, the method includes determining, for an image pixel element in the first image, a phase of the first blurred periodic projection pattern at the image pixel element.

In some embodiments, the processor is configured to determine, for the image pixel element in the first image, a sub-pixel position of the projector coordinate system corresponding to the image pixel element.

In some embodiments, the method includes determining, for the image pixel element in the first image, a sub-pixel position of the projector coordinate system corresponding to the image pixel element.

In some embodiments, the blur element allows a structured light system to operate at high speed. The blur element can enable a light projector (e.g., a DLP) to provide, at high speed, smooth sinusoidal patterns to allow for projector subpixel position determination. Such a high speed operation of the structured light system would not be possible without the blur element. In addition, the blur element can provide relatively uniform defocus across the scene of interest because it can provide sinusoidal patterns with a relatively consistent contrast throughout the scene of interest. Also, because the blur element allows the light projector to output binary patterns, the blur element allows the structured light system to use rolling-shutter imaging sensors, which tend to exhibit higher fidelity (e.g., higher signal-to-noise ratios) compared to global shutter imaging sensors.

In some embodiments, the phase-based Gray coding addresses interreflective surfaces. As illustrated in FIG. 25, greylevel illumination can be interreflected in the scene, with the consequence that illumination (encoding projection position) along one ray can be reflected into another portion of the scene and result in incorrect decoding of the illumination. Phase-based Gray coding, on the other hand, is less sensitive to incorrect decodings by virtue of the fact that the spatial high frequency illumination signal are usually interreflected as mixed, and reflected as relatively uniform illumination. In addition, phase-based Gray decoding is relatively computationally simple and can be performed on an FPGA physically near the image sensor, producing a sub-pixel phase image corresponding to the image sensor pixels, thereby not having to transfer all the raw images from the image sensor to a relatively powerful computational device (transferring such data could take a long time and be a speed performance bottleneck).

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 15A-15C illustrate the calibration of a projector 204 relative to the image capture devices 202 in accordance with some embodiments.

DETAILED DESCRIPTION

Figure 1A:
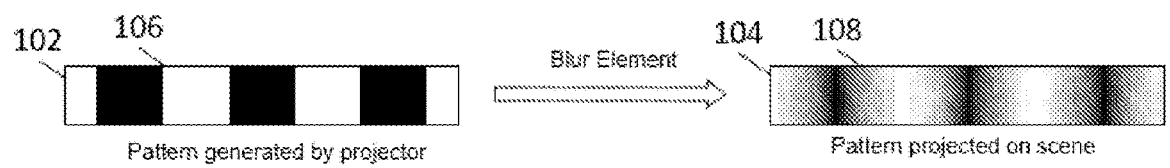
FIG. 1A illustrates an operation of a blurring element that blurs a binary projection pattern into a sinusoidal projection pattern in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The following introduces exemplary explanations of terms, according to one or more embodiments, that are used throughout the specification. These explanations are not intended to be limiting.

A structured light system uses a projector to project a projection pattern onto an object of interest and uses the distortions of the projected pattern to determine a 3D profile of the object or a 3D profile image (either of which hereinafter referred to as a 3D image or a 3D range image). Usually, the projector is designed to project a binary pattern (e.g., a pattern that includes only two values, for instance, a low intensity value and a high intensity value) onto the object so that the projector can project a large number of patterns within a given time. For example, a digital light processing (DLP) projector is designed to project binary patterns at 4000 patterns per second (4 kHz). Such a high projection rate allows the structured light system to estimate the 3D profile of an object at a correspondingly high rate.

Unfortunately, the structured light system using a binary projection pattern has a limited spatial resolution of depth. In particular, the spatial resolution of the 3D range image is often limited by the resolution of the projector.

In order to improve the spatial resolution of the structured light system, the projector of the structured light system could be designed to project a grey scale pattern (e.g., a pattern including more than two intensity values), instead of a binary pattern. The grey scale pattern can enable the structured light system to resolve spatial changes in the 3D profile that could not otherwise be resolved using a binary pattern. However, the projection rate of most projectors is significantly reduced in the grey scale projection mode. Therefore, it is often difficult to design a structured light system that is capable of maintaining a high throughput and high spatial resolution at the same time.

The present disclosure provides a high resolution structured light system that is also capable of maintaining high throughput. The high resolution structured light system includes one or more image capture devices, such as a camera and/or an image sensor, a projector, and a blurring element. The projector is configured to project a binary pattern so that the projector can operate at high throughput. The binary projection pattern is subsequently filtered by the blurring element to remove high frequency components of the binary projection pattern. This filtering smoothes out sharp edges of the binary projection pattern, thereby creating a blurred projection pattern that changes gradually between the low value and the high value. This gradual change can be used by the structured light system to resolve spatial changes in the 3D profile that could not otherwise be resolved using a binary pattern.

In some embodiments, the blurring element can be configured to blur the binary projection pattern into a sinusoidal projection pattern. FIG. 1A illustrates an operation of a blurring element that blurs a binary projection pattern into a sinusoidal projection pattern in accordance with some embodiments. For the sake of simplicity, FIG. 1A shows an operation of the blurring element on a one-dimensional binary projection pattern 102, but the blurring element can operate on a two-dimensional binary projection pattern as well.

Figure 1B:
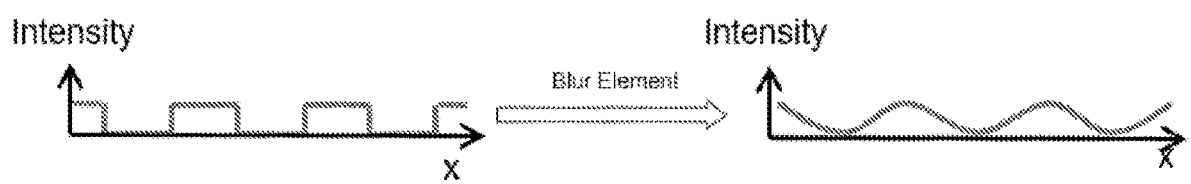
FIG. 1B illustrates a one-dimensional cross section of the binary projection pattern 102 and the sinusoidal projection pattern 104 in accordance with some embodiments.

The blur element is configured to blur the binary projection pattern 102 to create a sinusoidal projection pattern 104. The sharp edge 106 between two values in the binary projection pattern 102 is blurred out to create a gradual, blurred edge 108 between two values in the sinusoidal projection pattern 108. FIG. 1B illustrates a one-dimensional cross section of the binary projection pattern 102 and the sinusoidal projection pattern 104 in accordance with some embodiments. The continuous change of the intensity values in the sinusoidal projection pattern 108 can be used to resolve 3D range information that could otherwise not be determined.

In some embodiments, the blur element is configured to modify the spatial frequency content of the projection pattern projected onto the plane of interest, such that the projection pattern has a relatively uniform modulation transfer function throughout the plane of interest.

In some embodiments, the blur element includes an optical device that is configured to create, from a projection pattern, a plurality of spatially-shifted projection patterns and to super-impose the plurality of spatially-shifted projection patterns to provide a relatively uniform modulation transfer function throughout the plane of interest.

In some embodiments, the blur element includes a regular or random micro prism to provide spatial displacement of a projection pattern. In some embodiments, the blur element includes a micro lens array to provide spatial displacement of a projection pattern.

In some embodiments, the blur element includes a continuous axis-symmetric or two-dimensional polynomial surface, creating multiple images of a projection pattern displaced along the optical axis.

In some embodiments, the blur element includes a kinoform or Fresnel surface with multiple focal zones displaced along the optical axis.

In some embodiments, the one or more image capture devices and the projector in the structured light system can be calibrated. In order to estimate the 3D range image from information obtained from image capture devices, the structured light system may estimate the correspondence between coordinate systems of the image capture devices and the coordinate system of the projector. The process for determining the correspondence between coordinate systems of the image capture devices and the coordinate system of the projector is called calibration.

In some embodiments, the structured light system can be configured to estimate a correspondence between a coordinate system of an image capture device (hereinafter referred to as an image coordinate system) and a coordinate system of a projector (hereinafter referred to as a projector coordinate system). In some embodiments, the projector of the structured light system can be configured to project a sequence of binary patterns that are phase-shifted from one another. For example, the projector can project a first, one-dimensional binary pattern that is periodic with a period T. The projector can also project a second, one-dimensional binary pattern that is identical to the first binary pattern, but is shifted by a period of T/4. The projector can also project a third, one-dimensional binary pattern that is identical to the first binary pattern, but is shifted by a period of T/2. The projector can also project a fourth, one-dimensional binary pattern that is identical to the first binary pattern, but is shifted by a period of 3T/4.

These binary projection patterns generated by the projector are subsequently blurred by the blur element, thereby creating a series of phase-shifted sinusoidal projection patterns on an object of interest, such as a focus plane. The image capture device can capture images of phase-shifted sinusoidal projection patterns on the object of interest and provide the images to a 3D range image estimation module. Subsequently, at each image pixel element of the captured image, the 3D range image estimation module determines the phase of the sinusoid measured at that image pixel element. Based on the determined phase of the sinusoid, the 3D range image estimation module can determine a correspondence between the image pixel element and a subpixel position on the projector coordinate system.

In some embodiments, the structured light system can determine the correspondence between an image pixel element and a subpixel position on the projector coordinate system using an encoding method that encodes the projector position in temporally acquired images. For instance, image capture device can capture multiple images over a time period during which the object of interest and the image capture device are stationary with respect to each other. Because the image capture device acquires multiple images at each image pixel element, the image capture device captures multiple greylevels at each image pixel element. These greylevel measurements encode the Gray code and the Gray code can encode the projector position corresponding to each image pixel element.

For example, if an image capture device measures, at the image pixel element (252,1676), 8-bit greylevel measurements, (152,71,155,34,127,86,49,87,163,155,71), then that indicates that the image pixel element (252,1676) corresponds to the projector pixel column 1659 because (152,71,155,34,127,86,49,87,163,155,71) corresponds to the Gray code bits (1,0,1,0,1,0,0,0,1,1,0) and the Gray code bits corresponds to a binary number (1,1,0,0,1,1,1,1,0,1,1), which corresponds to the projector column 1659. Such encoding can provide us with the integral-pixel projector coordinates.

In some embodiments, when an image capture device acquires additional images for an image pixel element, those additional greylevel measurements can encode the subpixel projector position. For example, suppose the projector projects four values at the projector column 1659 corresponding to values (1+cos($\alpha$)) at $\alpha$=0, 90, 180, 270 degrees (namely, 2,1,0,1). Also, suppose the projector projects four values at the projector column 1661, corresponding to values (1+cos($\alpha$)) at $\alpha$=90, 180, 270, 360 degrees (namely, 1,0,1,2). This indicates that the projector column 1661 is at a phase shift of 90 degrees from the projector column 1659. Additionally, suppose that the image capture device captures four greylevel measurements (194,66,6,134) for an image pixel element (252,1676), corresponding to (100*(1+cos(20)), 100*(1+cos(110)), 100*(1+cos(200)), 100*(1+cos(290))). These greylevel measurements indicate that the projector column position corresponding to the image pixel element has a phase shift of 20 degrees from the projector column 1659. From this information, the structured light system can determine that the image pixel element (252,1676) corresponds to a projector coordinate 1659.44. Put another way, the structured light system can analyze the additional sensor greylevel measurements and determine, based on the phase shift $\alpha$ as measured by the image sensor element, the subpixel projector column position corresponding to the image sensor element.

The sub-pixel correspondence between an image sensor element and a projector column position can be determined because (1) an image sensor element corresponds to a ray in space, and if the camera calibration is known, the physical position of the ray corresponding to the image sensor element is known, and (2) a projector column corresponds to a sheet in space, and if the projector calibration is known, the physical position of the sheet corresponding to the projector column is known. The physical ray of the image sensor element and the physical sheet of the projector column can be intersected to determine the intersection point, which is the sample point of the scene. In some cases, the distance between the closest points on the sensor ray and the corresponding projector element position can indicate the confidence level in the determination that the projector element position corresponds to the image pixel element. For example, when the distance is short, then that indicates a higher confidence in the determination, and when the distance is long, then that indicates a lower confidence in the determination.

Figure 2:
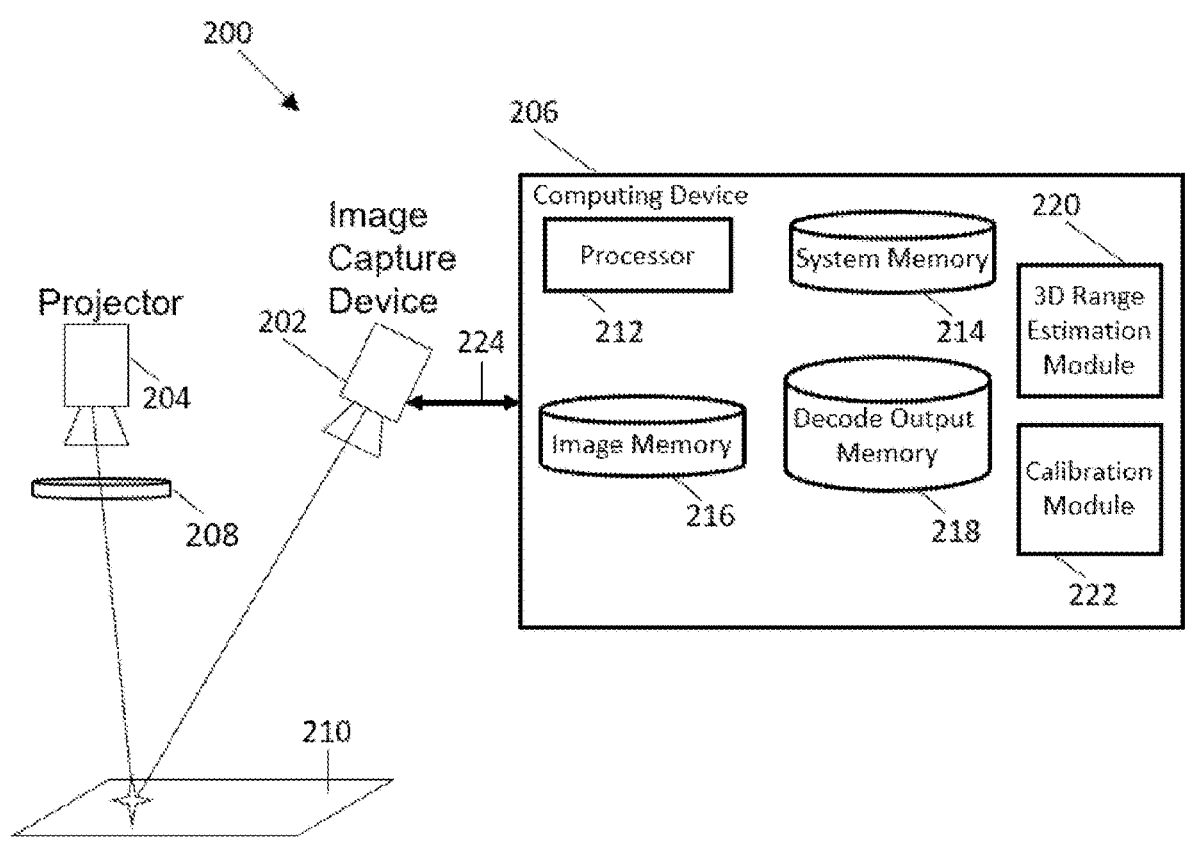
FIG. 2 illustrates a high speed structured light system in accordance with some embodiments.

FIG. 2 illustrates a high speed structured light system in accordance with some embodiments. The structured light system 200 includes one or more image capture devices 202, a projector 204, a computing device 206, and a blur element 208. The projector 204 is configured to generate a binary projection pattern, which is blurred by the blur element 208 and projected onto a plane of interest 210. The projected pattern on the plane of interest 210 is captured by the one or more image capture devices 202. Subsequently, the one or more image capture devices 202 provide the captured image(s) to the computing device 206 to generate a 3D range image.

In one sense, a structured light system 200 is a 3D sensor system configured to estimate 3D profile information of a static scene. The structured light system 200 is configured to project a known projection pattern onto a static scene using the projector 204 and acquire multiple images using the image capture device 202. Oftentimes, the projector 204 is configured to project a different projection pattern for each image captured by the image capture device 202. In some embodiments, the projection pattern can be monochromatic. In other embodiments, the projection pattern can be polychromatic.

In some embodiments, the one or more image capture devices 202 can include an image sensor, such as a charge-coupled device (CCD) image sensor or a complementary metal-oxide-semiconductor (CMOS) image sensor, a line-scan sensor, a flying spot scanner, an electron microscope, and/or any type of sensor device that is capable of capturing the wavelengths projected by the projector 204. When the system 200 includes a plurality of image capture devices 202, the plurality of image capture devices 202 can be calibrated. In some embodiments, the one or more image capture devices 202 can include a smart camera that has a processing unit and a memory. The smart camera can be configured to process the captured image locally.

In some embodiments, the projector 204 can include an array of light elements configured to project light. Each light element can be controlled independently so that the array of light elements collectively projects a projection pattern. The light elements can be addressed using a 2-dimensional coordinate system, herein referred to as a projector coordinate system.

In some embodiments, the projector 204 can include a digital light processing (DLP) projector. A DLP projector is a display device that uses an array of digital micro-mirror devices to project a pattern or an image. Each micro-mirror device is a light element and it represents one or more pixels in the projection pattern. When the micro-mirror device is arranged to reflect light towards the plane of interest 210, the micro-mirror device is in the "on" state and the pixel(s) corresponding to the micro-mirror device would have a high value. In contrast, when the micro-mirror device is arranged to reflect light away from the plane of interest 210, the micro-mirror device is in the "off" state and the pixel(s) corresponding to the micro-mirror device would have a low value. Because the micro-mirror device can switch between the "on" and "off" states at a high frequency, the DLP projector 204 can generate a binary pattern at a high frequency.

The DLP projector can also generate a grey scale pattern. The DLP projector can generate a grey scale pattern by rapidly toggling the micro-mirror devices between the "on" and "off" states. The proportion of time spent in the "on" and "off" states determines the grey scale value for to the micro-mirror device. Because the micro-mirror device has to switch between the "on" and "off" states to generate a single grey scale value, the DLP projector 204 generally operates at a lower rate in the "grey scale mode" compared to the "binary mode."

In some embodiments, the blur element 208 is configured to blur a pattern projected by the projector 204. In some embodiments, the blur element 208 is configured to blur the projection pattern of the projector 204 to transform a periodic square wave pattern into a sinusoidal pattern.

In some embodiments, the blur element 208 can be part of the projector 204. For example, the blur element 208 can be mounted on the projector in the light path between the projector 204 and the plane of interest 210. In other embodiments, the blur element 208 can be separate from the projector 204.

In some embodiments, the projector 204 can include an optical device that is separate from the blur element 208. For example, the projector 204 can include a lens having a predetermined focal length that is designed to focus the projected pattern on the plane of interest 210. This lens can be separate from the blur element 208 which blurs the projected pattern that would otherwise be focused at the plane of interest 210. In other embodiments, the blur element 208 can be designed to focus the projected pattern on the plane of interest 210 and to controllably blur the projected pattern on the plane of interest 210. Such a blur element 208 can replace the lens in the projector 204.

In some embodiments, the computing system 206 coupled to the one or more image capture devices 202 can process the image(s) captured by the image capture devices 202. The computing device 206 can include a processor 212, a system memory device 214, an image memory device 216, a decode output memory device 218, and a 3D range estimation module 220.

In some embodiments, the processor 212 can execute machine executable instructions. The processor 212 is implemented in hardware using an application specific integrated circuit (ASIC), programmable logic array (PLA), digital signal processor (DSP), field programmable gate array (FPGA), or any other integrated circuit. The processor 212 suitable for the execution of a computer program include, by way of example, both general and special purpose microprocessors, digital signal processors, and any one or more processors of any kind of digital computer. Generally, the processor 212 receives instructions and data from a read-only memory or a random access memory or both.

In some embodiments, one or more memory devices 214, 216, 218 can store instructions and/or data. The memory devices 214, 216, 218 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory devices 214, 216, 218 can be used to temporarily store data. The memory devices 214, 216, 218 can also be used for long-term data storage. The processor 212 and the memory devices 214, 216, 218 can be supplemented by and/or incorporated into special purpose logic circuitry.

In some embodiments, the 3D range estimation module 220 is configured to generate a 3D profile image from images captured by the image capture device(s) 202. In some cases, when the structured light system includes two or more image capture devices, the 3D range estimation module 220 can use images taken substantially simultaneously from different positions to estimate the 3D profile image. In some cases, when the structured light system includes only one image capture device, the 3D range estimation module 220 can use images taken sequentially from different positions to estimate the 3D profile image. In some cases, when the structured light includes only one image capture device, the 3D range estimation module 220 can use images taken sequentially from the same position to estimate the 3D profile image.

In some embodiments, the calibration module 222 is configured to determine a correspondence between coordinate systems of one or more image capture devices 202 and a coordinate system of a projector. The calibration module 222 can be configured to calibrate the one or more image capture devices 202 to determine the correspondences between the image coordinate systems of the one or more image capture devices 202 (e.g., the image capture device calibration information). Subsequently, the calibration module 222 can use the image capture device calibration information to determine the correspondence between the projector coordinate system and the image coordinate systems.

In some embodiments, the 3D range estimation module 220 can be implemented in software. The software can run on a processor 212 capable of executing computer instructions or computer code. In other embodiments, the 3D range estimation module 220 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, two or more modules 220, 222 can be implemented on the same integrated circuit, such as ASIC, PLA, DSP, or FPGA, thereby forming a system on chip. Subroutines can refer to portions of the computer program and/or the processor/special circuitry that implement one or more functions.

In some embodiments, the interface 224 is configured to provide communication between the image capture device 202 and the computing device 206. The interface 224 can be implemented in hardware to send and receive signals in a variety of mediums, such as optical, copper, and/or wireless interfaces, and in a number of different protocols, some of which may be non-transient.

The computing device 206 can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, the computing device 206 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the computing device 206 can include a server. The server can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

Figure 3:
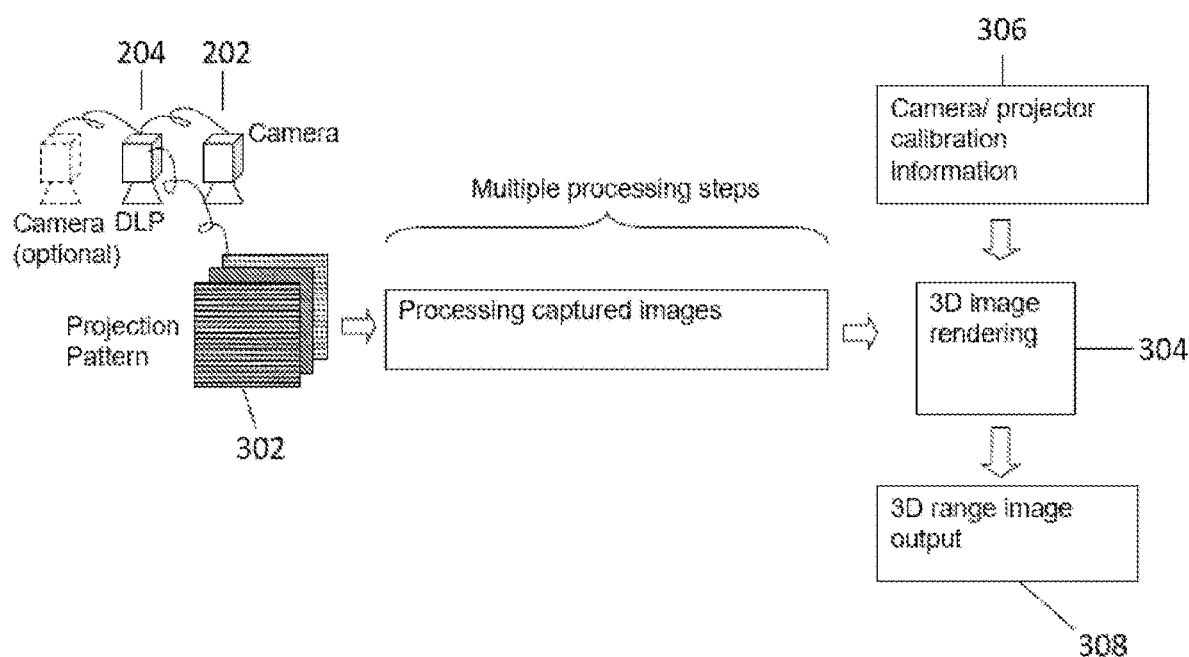
FIG. 3 illustrates the information flow in a structured light system 200 in accordance with some embodiments.

The structured light system 200 can be considered to include (1) an image formation system, (2) an image acquisition system, and (3) an image processing system. FIG. 3 illustrates the information flow in a structured light system 200 in accordance with some embodiments. The image formation system, including, for example, the projector 204 and the blur element 208, is configured to form a projection pattern 302 on a plane of interest 210. Subsequently, the image acquisition system, including, for example, the image capture device(s) 202, is configured to capture the projection pattern 302 from the plane of interest 210. Lastly, the image processing system, including the 3D range estimation module 220, is configured to process the input images to compute correspondences and pixel positions of the projection patterns, process and render 304 the 3D range image by combining the correspondences and pixel positions with the structured light system calibration information 306, and provide the rendered 3D range image to an output 308.

Hereinafter, a projector pixel element refers to a light element of a projector 204. The projector 204 can include a plurality of projector pixel elements that are arranged as a two-dimensional array. The two-dimensional array of the projector pixel elements is referred to as a projector coordinate system. The projector coordinate system can include a column index and a row index.

Hereinafter, an image pixel element refers to a sensor element in an image capture device 202. The image capture device 202 can include a plurality of image pixel elements that are arranged as a two-dimensional array. The two-dimensional array of the image pixel elements is referred to as an image coordinate system. The image coordinate system can include a column index and a row index.

Image Formation System

The structured light system 200 includes a projector 204 that is capable of projecting a predetermined pattern onto a plane of interest 210. In some embodiments, the projector 204 can include a DLP projector. The DLP projector is advantageous because the DLP projector can provide white light illumination to generate a two-dimensional area-scan image. The DLP projector is advantageous also because the DLP projector can also provide a grey scale texture-mapped 3D range image/mesh.

In some embodiments, the DLP projector is configured to generate a binary projection pattern. Using a binary projection pattern is advantageous because a DLP projected binary pattern is constant and therefore does not require a particular exposure, nor does it require global shuttering.

Figure 4:
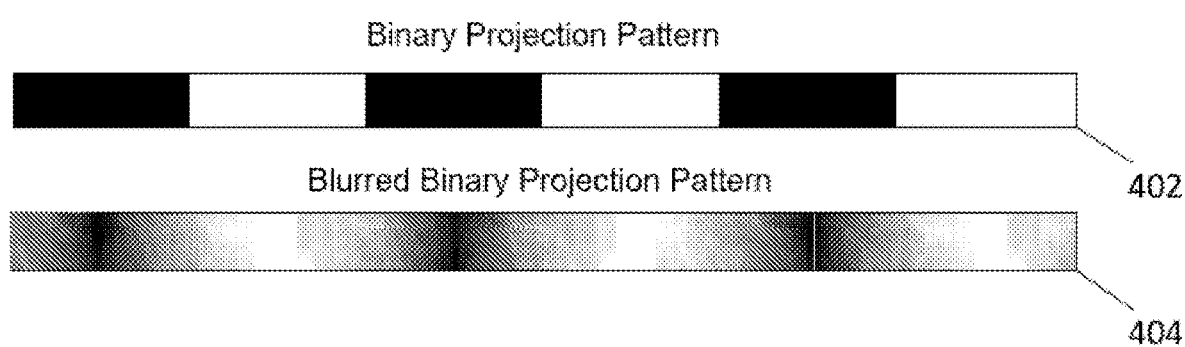
FIG. 4 illustrates a binary projection pattern and a blurred binary projection pattern in accordance with some embodiments.

In some embodiments, the binary pattern generated by the DLP projector can be projected through a blur element 208. In some cases, the blur element 208 is designed to blur the binary projection pattern into a sinusoidal pattern. This allows the structured light system 200 to use the projection pixel encoding technique to measure subpixel projection positions. FIG. 4 illustrates a binary projection pattern 402 and a blurred binary projection pattern 404 in accordance with some embodiments.

In some embodiments, the amount of blurring performed on the binary projection pattern 402 by the blur element 208 (e.g., the width of the blur kernel or a point spread function (PSF)) is substantially identical to the width of the highest frequency pattern to be blurred. In some cases, when the binary projection pattern 402 is a multi-period binary pattern (e.g., a Grey coding image), then the blur element 208 is designed so that the width of the PSF of the blur element 208 is substantially similar to the width of the highest frequency pattern (e.g., the pattern with the shorted period). In other words, the size of the point spread function (PSF) associated with the blur element 208 is substantially identical to the shorted period in the multi-period binary pattern. Such a PSF would also affect lower frequency patterns (e.g., patterns with longer periods), but the amount of blurring would not be sufficient to adversely affect the processing of the lower frequency patterns.

Optical/Mechanical Blur Elements for Blurring Binary Projection Patterns

In some embodiments, the blur element 208 can include an optical element to induce blur in the binary projection pattern. The blur element 208 can include an optical element in the optical path between the light source and the plane of interest 210.

Figure 5A:
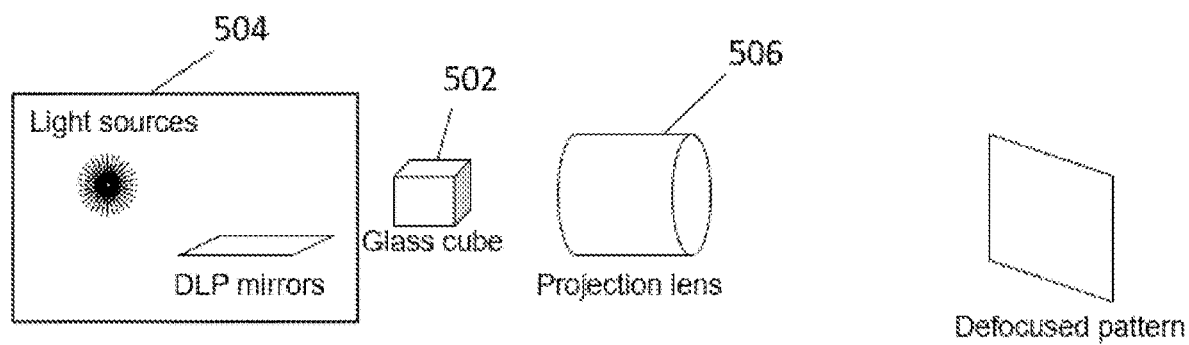
FIG. 5A illustrates a structured light system in which a blurring element includes a glass cube in accordance with some embodiments.
Figure 5B:
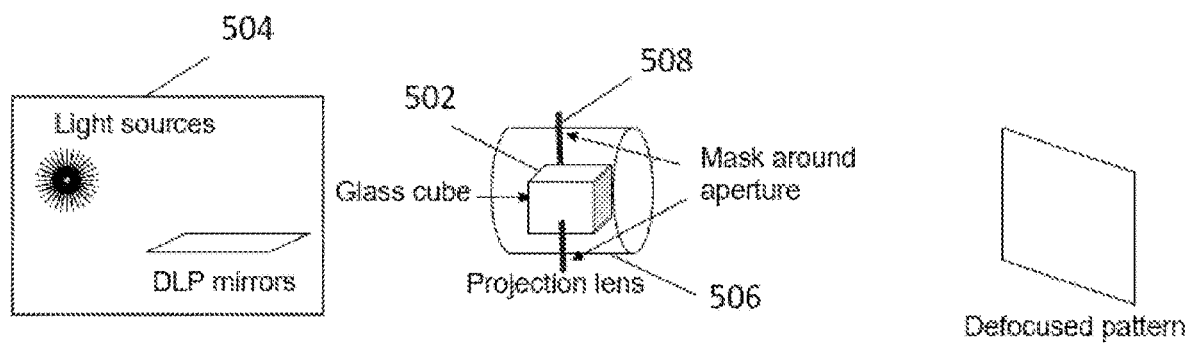
FIG. 5B illustrates a structured light system in which a blurring element including a glass cube is placed at the aperture stop of the projection lens of the projector in accordance with some embodiments.

In some examples, this optical element can include a transparent plate that is configured to add spherical aberration in the optical path. This configuration is shown in FIG. 5A in accordance with some embodiments. For example, the transparent plate can include a glass cube 502. The glass cube can be placed between the light element 504 of the projector 204 and the projection lens 506 of the projector 204. In some cases, when the beam is not collimated, this cube 502 can also be placed at the aperture stop of the projection lens 506 of the projector 204. This configuration is shown in FIG. 5B in accordance with some embodiments. The mask 508 serves as an aperture stop of the lens 506, which is configured to limit light rays to a bundle that the lens 506 is designed for.

Figure 5C:
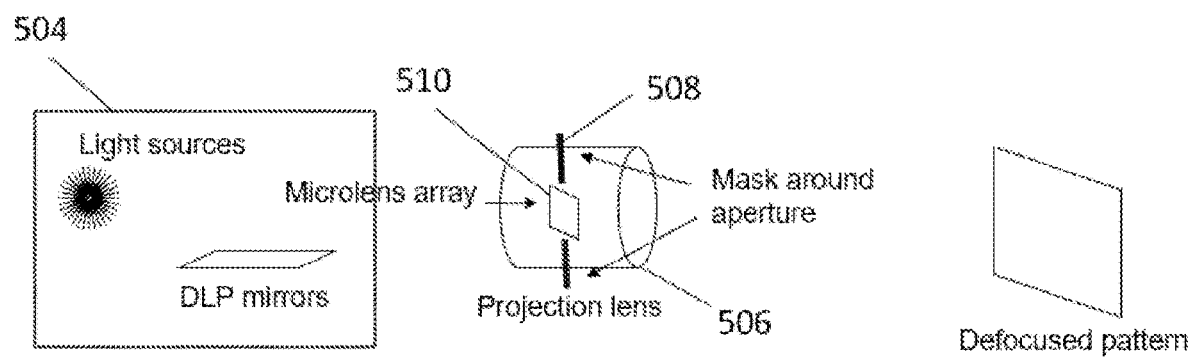
FIG. 5C illustrates a structured light system in which a blurring element including a micro-lens array is placed at the aperture of the projection lens in accordance with some embodiments.

In some examples, this optical element can include a micro-lens array 510 having a plurality of micro lenses. The plurality of micro lenses can have varying focal lengths. This way, the micro-lens array 510 can project multiple copies of the same input pattern at different focal distances. The micro-lens array 510 can be placed between the light element 504 of the projector 204 and the projection lens 506 of the projector 204, or it can be placed at the aperture of the projection lens 506, as shown in FIG. 5C in accordance with some embodiments.

In some examples, this optical element can include a multi-prism device that is configured to project two or more copies of the same input pattern at slight lateral offsets. In some examples, this optical element can include a multi-zone (e.g., kinoform) lens that has concentric zones of different focal lengths that superimpose different copies of the same input pattern at different focal distances. In some examples, this optical element can include a lens with a periodic or a quasi-periodic surface, imparting varying degrees of blur to small parts of the input pattern.

Figure 5D:
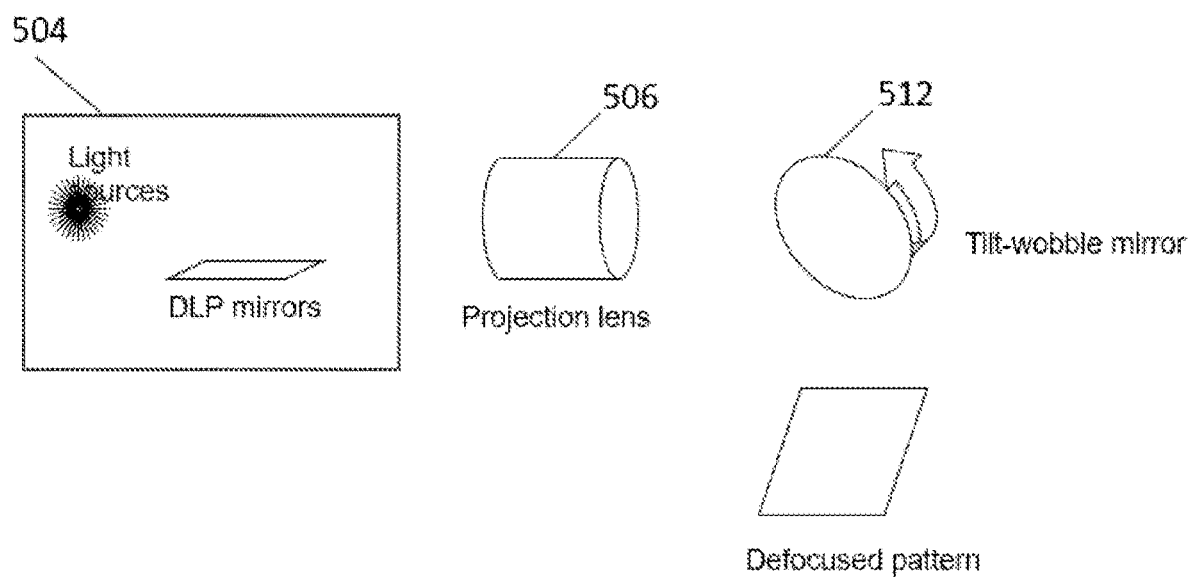
FIG. 5D illustrates a structured light system in which a blurring element includes a mechanical blurring system in accordance with some embodiments.

In some embodiments, the blur element 208 can include a mechanical blurring system. This configuration is shown in FIG. 5D in accordance with some embodiments. For example, the blur element 208 can include a tilted wobble mirror 512 placed along the optical path from the projection lens to the plane of interest 210.

In some embodiments, the projector 204 can include micro-mirror devices that are diagonally aligned (as opposed to horizontally/vertically aligned). If such a diagonally-aligned projector is used to project a vertical (or horizontal) pattern, the projected pattern would be jagged. Thus, for such diagonally aligned projectors, the projector 204 is configured to project diagonal patterns aligned to the micro-mirror devices.

Image Acquisition System

The structured light system 200 includes an image capture device 202 configured to capture an image of a pattern projected onto the plane of interest 210. It is generally advantageous for the projector 204 and the image capture device(s) 202 to have the same focus, even though the projector 204 and the image capture device(s) 202 are along different optical axes. Because conventional lens configurations induce focal planes perpendicular to the optical axes, one downside of having different optical axes is that the projector 204 and the image capture device(s) 202 have different, non-parallel focus planes.

Figure 6A:
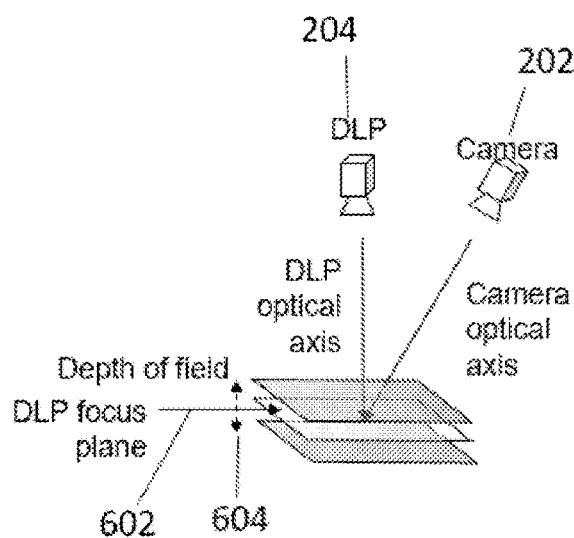
FIGS. 6A-6B illustrate the focus planes associated with a projector and an image capture device in a structured light system in accordance with some embodiments.
Figure 6B:
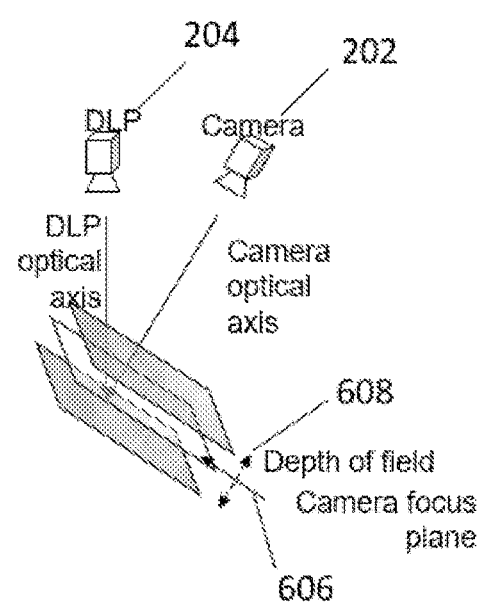

FIGS. 6A-6B illustrate the focus planes associated with a projector and an image capture device in a structured light system in accordance with some embodiments. In particular, FIG. 6A shows the focus plane 602 of the DLP projector and the depth of field 604 of the DLP projector 204 in accordance with some embodiments. FIG. 6B shows the focus plane 606 of the image capture device 202 and the depth of field 608 of the image capture device 202 in accordance with some embodiments. FIGS. 6A-6B illustrate that the projector 204 and the image capture device 202 having different optical axes have different, non-parallel focus planes. Due to the different, non-parallel focus planes of the projector 204 and the image capture device(s) 202, the volume in which both the projector 204 and the image capture device(s) 202 are in focus is limited. Therefore, the volume over which the structured light system 200 is capable of capturing high resolution 3D range image is limited in such an implementation.

In some embodiments, the image capture device 202 is configured to include a lens whose plane is not parallel to the image plane. Such an optical configuration is often referred to as Scheimpflug optics, and an image capture device having Scheimpflug optics is referred to as a Scheimpflug image capture device 202. A principle referred to as the Scheimpflug principle is a geometric rule that describes the orientation of the focus plane of an optical system when the lens plane is not parallel to the image plane.

Figure 7:
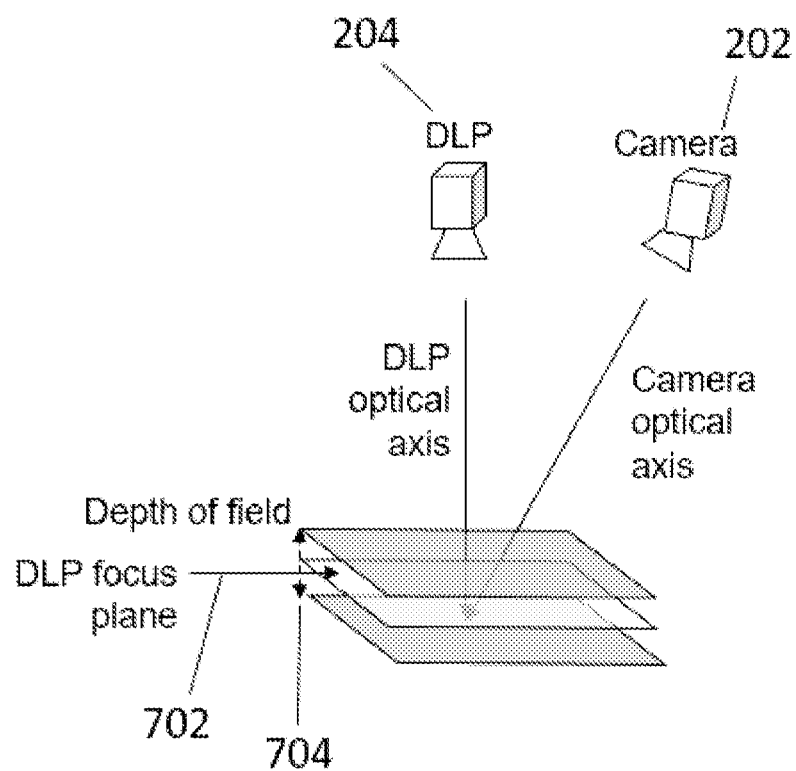
FIG. 7 illustrates the focus planes associated with a projector and a Scheimpflug image capture device in a structured light system in accordance with some embodiments.

FIG. 7 illustrates the focus planes associated with a projector and a Scheimpflug image capture device in a structured light system in accordance with some embodiments. This figure shows that the projector 204 and the Scheimpflug image capture device 202 having different optical axes actually has the same focus plane 702 and the same depth of field 704.

In some cases, the Scheimpflug condition refers to the tilting of the lens with respect to the image plane and the focal plane. More particularly, the Scheimpflug condition refers to an orientation of the focus plane 702 where the lens plane is not parallel to the image plane. When an object that is mostly a plane is tilted in depth relative to the focal plane 702 of an image capture device, its image will also be tilted in depth and be in an out of focus depending on position. The Scheimpflug condition refers to the tilts of the lens in the image capture device 202 and the focal plane that allow the image of the object to be in focus across the sensor or film of the image capture device 202. The plane of focus, the lens plane, and the image planes all intersect at a line. Thereby, for example, a projector 204, pointed down a with a vertical optical axis can have a horizontal focal plane, and an image capture device 202, with a non-vertical optical axis, can share the same focal horizontal focal plane 702. The Scheimpflug configuration can be implemented by suitably tilting the axis of the camera's lens and correspondingly suitably tilting the image sensor.

Using a Scheimpflug image capture device 202 is advantageous because the aligned focus planes 702 and the aligned depth of field 704 increase the measurement region where both the projector 204 and the image capture device 202 are in focus. Also the Scheimpflug image capture device 202 reduces observational differences between the projector 204 and the image capture device 202, which improves the accuracy in determining and localizing image correspondences between images.

In addition, the aligned focus planes 702 and the aligned depth of field 704 reduces the "false depth" observations, especially when the scene exhibits high contrast edges in responsivity. The false depth observations refer to 3-dimensional data measurements which do not correspond to positions in the scene. For example, a false depth measurement may refer to 3D measurements indicative of an elevated feature when the scene is flat and has no elevated features. The false depth is observed less near the center of the scene of interest and more at the edge of the scene of interest. Since the aligned focus planes 702 and the aligned depth of field 704 increase the volume of the scene of interest, the volume at which the "false depth" is observed is correspondingly less compared to the volume at which the false depth is not observed.

In some embodiments, the image capture device 202 is configured to include a shift lens. A shift lens can include a lens mounted on a motion actuator configured to move parallel to the image plane. A shift lens can provide similar benefits as Scheimpflug optics, with the addition benefit of having rectilinear fields of view. A shift lens configuration includes an image sensor that has a parallel optical axes with the projector. However, the image sensor can view the area illuminated by the projector by having the image sensor's horizontally shift their respective lenses. Although the optical axis of the lens in the image capture device 202 is parallel to the projector lens's optical axis, the image capture device 202 is viewing the same area because its lens is collecting rays along a tilted angle; it is this tilted angle which allows for triangulation between the image capture device 202 and the projector because if the axis corresponding to the image capture device 202 were coincident with the projector axis, then triangulation would not be possible.

In some embodiments, when the structured light system 200 includes a plurality of image capture device 202, one or more of the image capture devices 202 can include Scheimpflug optics or a shift lens. In some cases, all image capture devices can include Scheimpflug optics or a shift lens.

In some embodiments, when the projector 204 is configured to project a binary projection pattern, the image capture device 202 can be configured to acquire an image of the projected pattern using a rolling shutter acquisition technique. Rolling shutter cameras are amenable to binary projected DLP patterns because binary patterns are stably projected continuously during the acquisition time. The rolling shutter acquisition technique can be used as long as the illumination remains relatively constant during the rolling shutter acquisition and the scene is stationary. Because some image capture devices provide a higher signal-to-noise and/or larger dynamic range for rolling shutter acquisition, it may be advantageous to configure the projector 204 to project a binary projection pattern.

The structured light system 200 is configured to operate in normal indoor illumination, but in some applications, ambient illumination can be considered noise because ambient illumination adds spurious signals that can hinder the 3D profile estimation.

To reduce the effect of ambient illumination, in some embodiments, the projector 204 in the structured light system 200 can be configured to use narrowband illumination, and the image capture device(s) 202 can be configured to use a filter to capture only the narrowband illumination. For example, the projector 204 can be configured to use the red and/or blue light emitting diodes (LEDs) to illuminate the scene since the red and/or blue LEDs are narrowband illumination sources. Also, the image capture device(s) 202 can be configured to capture only the narrowband associated with the red and/or blue LEDs so that the image capture device(s) 202 can filter out spurious ambient illumination.

Figure 8:
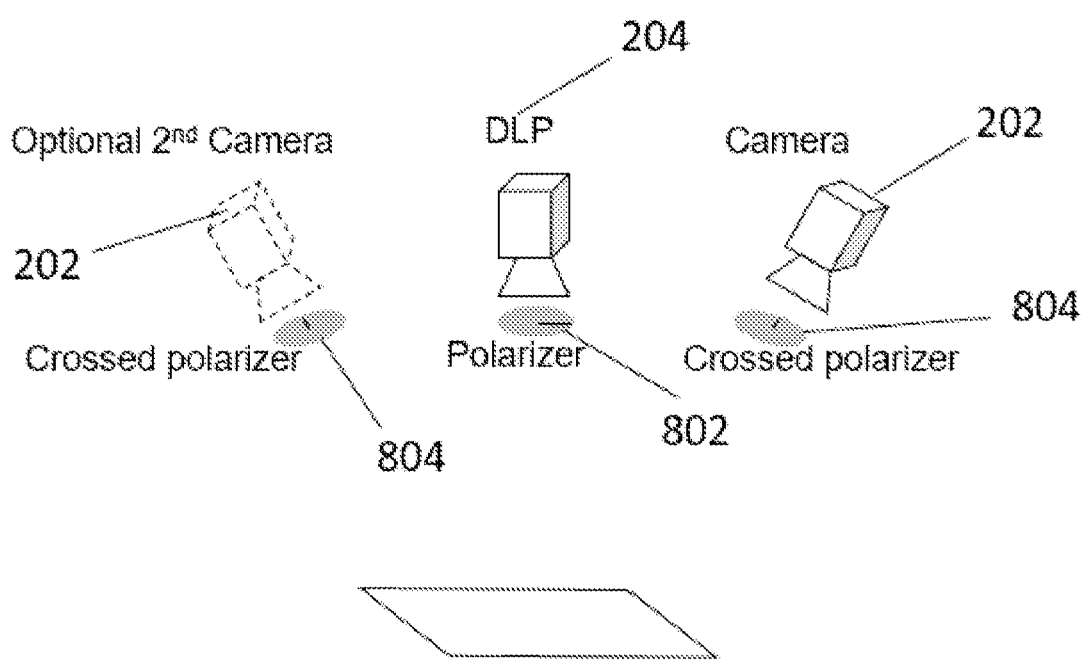
FIG. 8 shows a structured light system implementing cross polarization in accordance with some embodiments.

In some embodiments, the filter can include a multi-band filter that is matched to the wavelengths of the projector illumination. In other embodiments, the filter can include an electronically-controlled switchable narrowband filter that is matched to the wavelengths of the projector illumination. The electronically-controlled switchable narrowband filter allows the image capture device(s) 202 to measure multi-colored scenes. In some embodiments, the filter can include a narrowband filter that is matched to the wavelengths of the projector illumination In some embodiments, the structured light system 200 can improve the 3D measurement performance using a cross-polarization technique. FIG. 8 shows a structured light system implementing cross polarization in accordance with some embodiments. The structured light system 200 implementing the cross-polarization technique includes a projector 204 with a polarization filter 802 and an image capture device 202 with a cross-polarized filter 804. For example, the projector 204 can be configured to project a polarized projection pattern by, for instance, projecting a projection pattern through a polarization filter 802. Subsequently, the image capture device(s) 202 can capture an image of the polarized projection pattern through a cross-polarized filter 804. The cross-polarized filter 804 can reduce the proportion of direct specular return, which, in turn, increases the relative proportion of diffuse return. In some cases, a cross polarized filter 804 can include a pair of polarizing filters which are oriented at cross orientations so that polarized light passing through the first filter will be blocked by the second filter. In some cases, polarizing filters are intended to reduce the magnitude of specular signals because specular signals usually reflect light in the same polarity as the incident light. For example, the projected light passes through a polarizing filter 802. The reflected light may be scattered from a diffuse surface or reflected from a specular surface. A polarizer 804 in front of the image capture device 202 is then used to balance the amount of reflected light from the specular surface and the scattered light from the diffuses surface. Rotating that last polarizer 804 has no effect on the scattered light as its polarization is fully random due to the scatter. The specular light is still strongly polarized, so its intensity can be modulated by rotation.

In some embodiments, the structured light system 200 can use a plurality of image capture devices 202 to reduce remove the effect of direct specular return. The plurality of image capture devices 202 are configured to experience similar diffuse returns, but different direct specular returns that vary depending on the optical axes towards the cameras. Therefore, the structured light system 200 can appropriately reliable determine the diffuse image and suppress the direct specular return.

Image Processing System

Once the image capture device(s) 202 captures image(s), the image capture device(s) 202 is configured to provide the image(s) to the 3D range estimation module 220. Subsequently, the 3D range estimation module 220 is configured to process the images to generate an accurate 3D range image.

In some embodiments, the 3D range estimation module 220 is configured to analyze input images to estimate one or more of the following features, and to combine the estimated features to generate a 3D profile image. More particularly, the 3D range estimation module 220 is configured to determine one or more of the following: (1) grey coding for whole pixel projector position, (2) phase shifting for sub-pixel projector position, (3) stereo correspondence (along epipolar lines) and validation using projection coordinates, (4) stereo correspondence (along epipolar lines) without validation using projection coordinates, and/or (5) triangulation based on subpixel projector position.

In some embodiments, when the structured light system 200 includes a plurality of image capture devices 202, a portion of the scene can be viewable by two or more of the plurality of image capture devices 202. For such a portion of the scene, the structured light system 200 is configured to estimate the 3D information from (1) images taken by those two or more image capture devices and (2) the calibration information of the projector and the image capture devices. In some cases, it is possible that a portion of the scene is only be viewable by one of the image capture devices 202. For such a portion of the scene, the structured light system 200 is configured to estimate the 3D information from (1) images taken by that one image capture device and (2) the calibration information of the projector and the image capture device.

Correspondence Between Projector Coordinate System and Image Coordinate System

In some embodiments, images captured by the image capture devices 202 can include indicia of a projector coordinate system. If the projector coordinate system estimated from the images is consistent with the location estimated from the calibration of the image capture devices 202, the 3D range estimation module 220 can trust the 3D measurement. However, if the images captured by the image capture devices 202 do not indicate the projector coordinates, the 3D range estimation module 220 may determine the correspondence between the projector coordinate system and the location estimated from the calibration of the image capture devices 202 by normalizing correlations between temporal values along the epipolar lines.

In some embodiments, the projector 204 is configured to project a Gray code binary projection pattern. In each binary projection pattern, each projected pixel element (e.g., a corresponding light element in the projector 204) is either on (white) or off (black). When an image capture device 202 captures an image of the projected pattern on the plane of interest 210, each image pixel (e.g., a pixel in the image) corresponds to one of the projected pixel element. The 3D range estimation module 220 can be configured to determine the correspondence between the image pixel and the projected pixel element.

In some embodiments, the 3D range estimation module 220 is configured to determine the correspondence between the image coordinate system and the projector coordinate system by analyzing images projected by the projector 204. For example, the projector 204 can be configured to project Gray code patterns. Each Gray code pattern can have a plurality of pixel values that are arranged in accordance with the projector coordinate system. Each pixel value in a Gray code pattern can indicate one bit of a grey-coded value corresponding to a projector pixel element. The grey-coded value corresponding to a projector pixel element can indicate the column index of the projector pixel element. The image capture device 202 is configured to capture images of Gray code patterns and provide the images to the 3D range estimation module 220. Subsequently, for each image pixel element in images, the 3D range estimation module 220 is configured to determine the full grey-coded value. Since the full grey-coded value indicates the column index of the projector pixel element that is imaged by the image pixel element, this scheme allows the 3D range estimation module 220 to determine the correspondence between the projector pixel element and the image pixel element.

In some embodiments, once the 3D range estimation module 220 receives an image of a Gray code pattern, the 3D range estimation module 220 is configured to convert the Gray code image into a binary image. For example, for each image pixel element in the captured image, the 3D range estimation module 220 is configured to compare the grey-coded value against a predetermined threshold for that image pixel element. When the grey-coded value is greater than the threshold, the image pixel element is associated with a value "1"; when the grey-coded value is less than the threshold, the image pixel element is associated with a value "0."

In some embodiments, the 3D range estimation module 220 is configured to compute the threshold for a particular image pixel element by (1) receiving an image of a pattern having an "on" value at all pixels, (2) receiving an image of a pattern having an "off" value at all pixels, and (3) computing an average of the received "on" value and the received "off" value at the particular image pixel element.

In some embodiments, the 3D range estimation module 220 is configured to use a single image per Gray code pattern. For example, when a projector 204 projects a particular Gray code pattern onto a plane of interest 210, the image capture device 202 is configured to capture only one image of the Gray code pattern and provide the image to the 3D range estimation module 220. Subsequently, the 3D range estimation module 220 can use that single image to estimate the binary code associated with that Gray code pattern.

In some embodiments, the 3D range estimation module 220 is configured to use a two or more images per Gray code pattern, especially when the Gray code pattern includes high frequency components. For example, when a projector 204 projects a particular Gray code pattern onto a plane of interest 210, the image capture device 202 is configured to capture one image of the Gray code pattern and provide the "positive" image to the 3D range estimation module 220. Subsequently, the projector 204 projects an inverse of the particular Gray code pattern onto a plane of interest 210. Then the image capture device 202 can capture one "negative" image of the inverse Gray code pattern and provide the negative image to the 3D range estimation module 220. Once the 3D range estimation module 220 receives the positive image and the negative image of the Gray code pattern, the 3D range estimation module 220 can directly compare the image pixel values in the positive image and the negative image to determine whether the binary value should be a "1" or a "0."

In some embodiments, the 3D range estimation module 220 is configured to use a phase-based Gray coding technique, as disclosed in detail below.

Invalidation of Image Pixel Element

In some embodiments, the 3D range estimation module 220 can invalidate a Gray code value of certain image pixel element. When the 3D range estimation module 220 invalidates a Gray code value of a certain image pixel element, the 3D range estimation module 220 can discard the Gray code value of that certain image pixel element.

In some embodiments, the 3D range estimation module 220 can invalidate a Gray code value of certain image pixel element based on brightness saturation. For example, the brightness saturation can cause blooming of a pixel element, which refers to a phenomenon in which a bright image pixel element increases the grey levels of neighboring image pixel elements), which in turn induces incorrect decoding of the Gray code patterns. In some embodiments, the 3D range estimation module 220 can invalidate an image pixel element based on an image of an "all on" pattern projected by the projector 204. When an image of an "all on" pattern is bright saturated at a particular image pixel element, that image pixel element can be invalidated.

In some embodiments, the 3D range estimation module 220 can invalidate a Gray code value of certain image pixel element based on dark saturation. For example, if an image pixel element indicates that even a bright illumination is "dark," then it is difficult to distinguish between bright illumination (which appears dark) and dark illumination (which appears dark). The minimum useful grey level depends on the contrast of the projected illumination and the noise level of the sensor. For example, if a projected illumination has contrast of 100% and the noise level of the sensor is 1 grey level, then it is conceivable that even an image pixel element corresponding to 2 grey levels for bright illumination could be deduced.

In some embodiments, the 3D range estimation module 220 can invalidate a Gray code value of certain image pixel element based on low contrast. When the contrast of an image pixel element is too low, it may be difficult to distinguish between bright illumination (e.g., an all-on image where each projector pixel element is in an "on" state) and dark illumination (e.g., an all-off image where each projector pixel element is in an "on" state). For example, the 3D range estimation module 220 can determine a first value of an image pixel element that captures an all-on image. The 3D range estimation module 220 can also determine a second value of an image pixel element that captures an all-off image. Subsequently, the 3D range estimation module 220 can compute the difference between the first value and the second value. If the difference is too low, the 3D range estimation module 220, the 3D range estimation module 220 can determine that the image pixel element is invalid.

Figure 9:
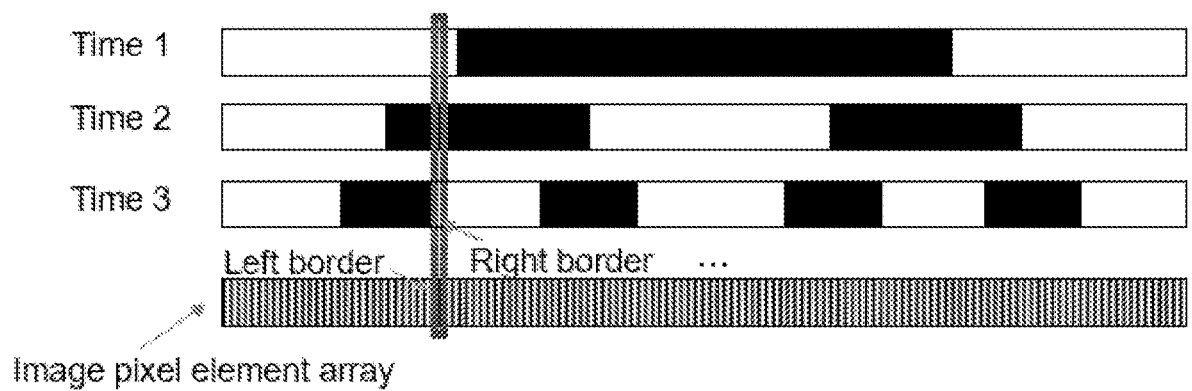
FIG. 9 illustrates a property of a Gray code pattern in accordance with some embodiments.

In some embodiments, the 3D range estimation module 220 can invalidate a Gray code value of a certain image pixel element when that image pixel element leads to inconsistent decoding. The 3D range estimation module 220 can determine that an image pixel element leads to inconsistent decoding based on a property of Grey Coding. FIG. 9 illustrates a property of a Gray code pattern in accordance with some embodiments. Grey Coding has a property that adjacent coded values differ by one, and only one, bit. Therefore, each image pixel element should be on the "border" of two Gray code patterns—because that image pixel element should straddle exactly two bands of illumination. In particular, an image pixel element should be on the left side of one band for one projected pattern and the right side of another band for another projected pattern. Based on this property of grey coding, the 3D range estimation module 220 is configured to invalidate an image pixel element when the pixel element's grey level, which should correspond to interior of a band within the Gray code pattern, is too close to the binarization threshold.

Phase Shifted Patterns

Figure 10:
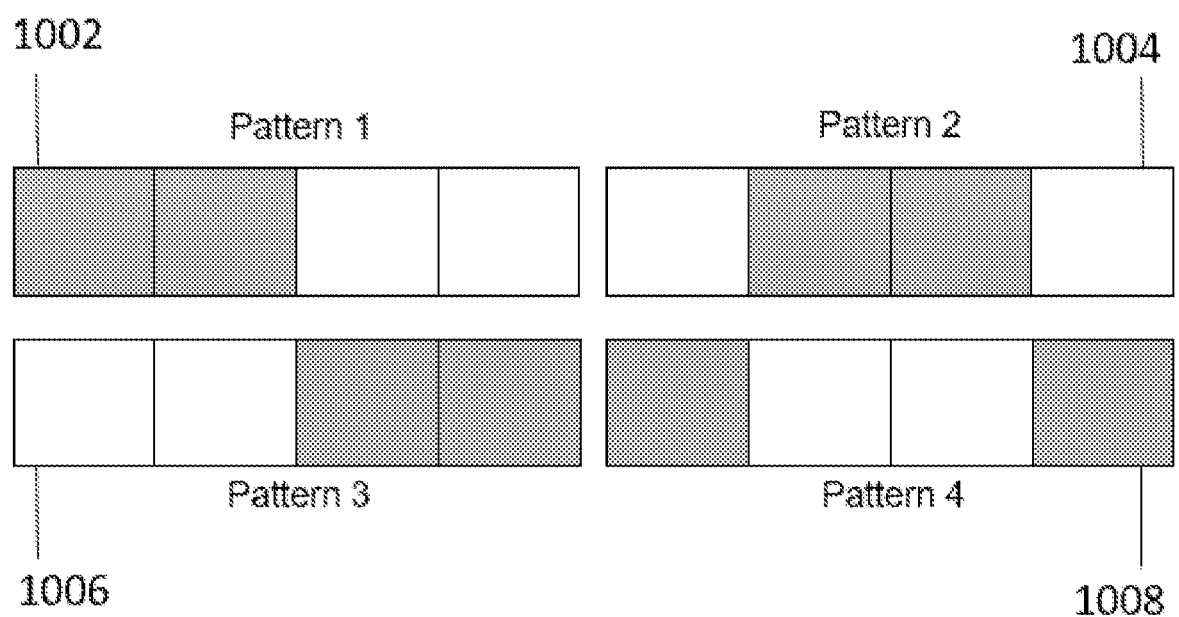
FIG. 10 illustrates four patterns for the highest frequency of a grey coding pattern in accordance with some embodiments.

In some embodiments, the structured light system 200 can use a plurality of grey coding patterns for a particular frequency. FIG. 10 illustrates four patterns for the highest frequency of a grey coding pattern in accordance with some embodiments. For example, a projector 204 can be configured to project a plurality of patterns 1002, 1004, 1006, 1008 having substantially identical frequency magnitude characteristics, but different phase characteristics. In some cases, the projector 204 can be configured to use four patterns 1002, 1004, 1006, 1008 for the highest frequency of the grey coding pattern; in other cases, the projector 204 can be configured to use four patterns 1002, 1004, 1006, 1008 for the mid frequency of the grey coding pattern.

In some embodiments, the 3D range estimation module 220 is configured to use a plurality of phase shifted patterns to compute the minimum/maximum grey levels for each image pixel element. The minimum/maximum grey levels allow the 3D range estimation module 220 to compute the minimum/maximum grey levels without using all "on" and all "off" patterns, as discussed above. In some embodiments, the minimum and maximum grey levels of an image pixel element can be used to determine the validity of an image pixel element.

In some cases, the 3D range estimation module 220 is configured determine the minimum/maximum grey levels based on numerical computation. Consider the image pixel element values v0, v1, v2, v3 corresponding to the four phase shifted patterns. The cosine value corresponds to half of the difference between v0 and v2, and the sine value corresponds to half of the difference between v1 and v3. The threshold corresponds to the mean value, $(v0+v1+v2+v3)/4$. The amplitude of the wave corresponds to $\sqrt{((v0-v2)/2)^2+((v1-v3)/2)^2}$. Consequently, the maximum value corresponds to (mean+amplitude) and the minimum value corresponds to (mean-amplitude).

In some cases, the 3D range estimation module 220 is configured determine the minimum/maximum grey levels using the minimum/maximum grey levels of the four Quadrature images to. If the structured light system is using more than four Quadrature images (say 8 images), then the 3D range estimation module 220 can use the minimum and maximum of those 8 images to determine the minimum and maximum values.

Figure 11:
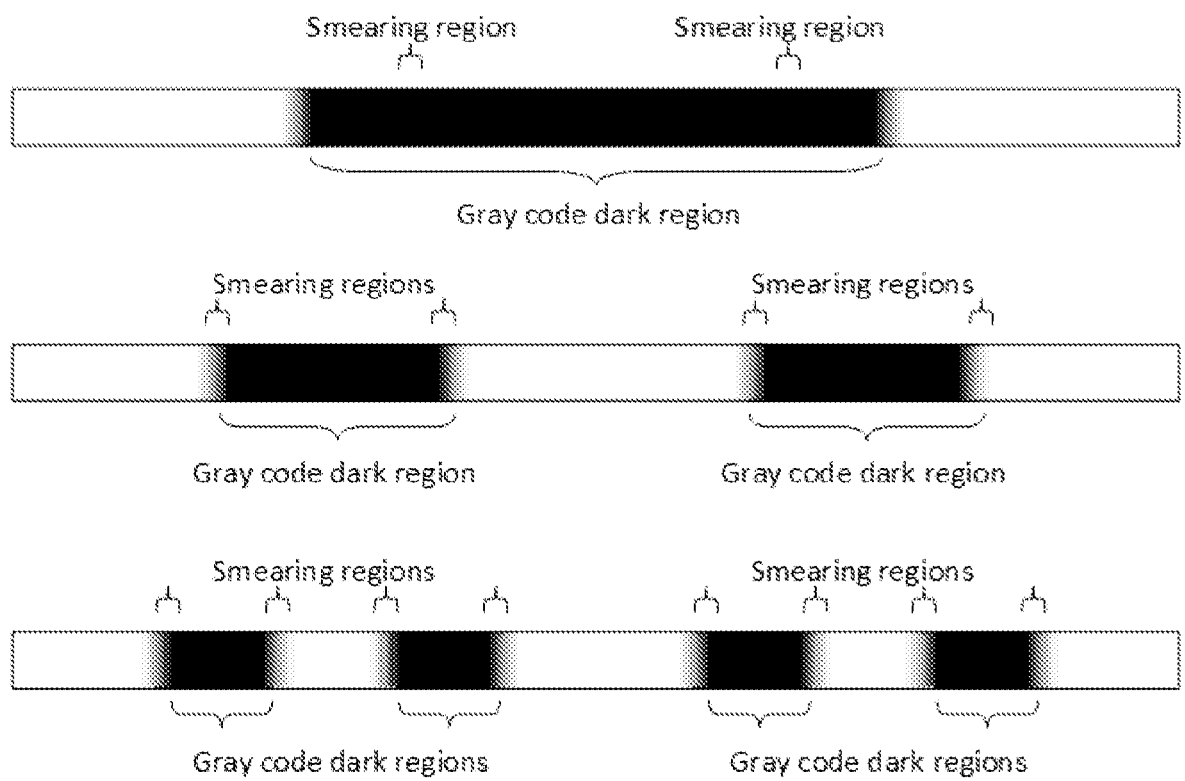
FIG. 11 illustrates a blurring of some Gray code patterns in accordance with some embodiments.

In some embodiments, the grey coding projection pattern from the projector 204, such as the phase shifted high frequency patterns, can be blurred by a blur element 208. FIG. 11 illustrates a blurring of some Gray code patterns in accordance with some embodiments. In some embodiments, the blur element 208 can be configured to blur the grey coding projection patterns to turn a binary signal into a sinusoidal signal.

In some embodiments, the 3D range estimation module 220 is configured to use the sinusoidal grey coding pattern to determine a correspondence between an image pixel element and a sub-pixel position in the projector coordinate system. In particular, the 3D range estimation module 220 is configured to determine a phase of a one-dimensional sinusoidal grey coding pattern, and map the phase to a sub-pixel position in the projector coordinate system. The phase can be determined by $\tan^{-1}$(sine value, cosine value), where the cosine value corresponds to half of the difference between v0 and v2, and the sine value corresponds to half of the difference between v1 and v3, as discussed above.

False Depth Measurement Removal

Figure 12:
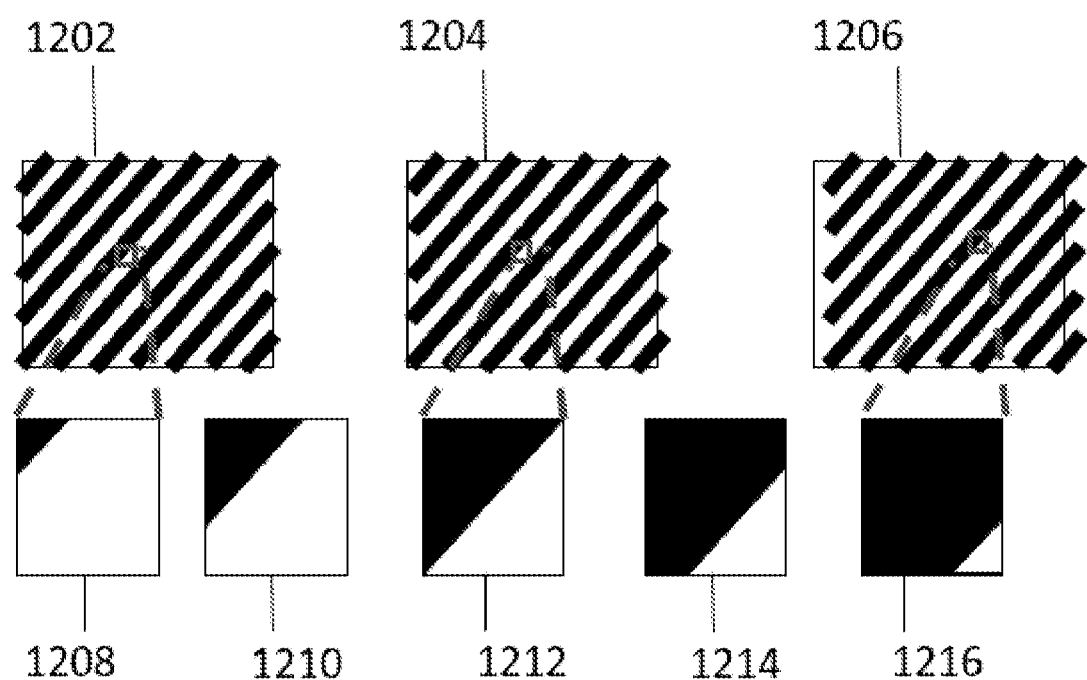
FIG. 12 shows a movement of a projected pattern across a field of view in accordance with some embodiments.

In some cases, an object of interest with reflective surfaces can induce false depth measurements. For example, the 3D range estimation module 220 may be confused between the actual object of interest and another object imaged on the reflective surface of that actual object. To address this issue, the 3D range estimation module 220 can be configured to detect reflective surfaces. When the projector 204 provides a series of high frequency patterns, the stripes in the patterns generally "move" in a uniform direction across the scene. FIG. 12 shows a movement of a projected pattern across a field of view in accordance with some embodiments. For example, when a projector provides a series of high frequency patterns 1202, 1204, 1206, the stripes in the patterns, for example, 1208, 1210, 1212, 1214, 1216 generally "move" in a uniform direction across the scene, which is expected. However, when a particular region moves in a different direction than the rest of the scene, then that region is considered anomalous and that region may correspond to a reflective surface. Therefore, the 3D range estimation module 220 can be configured to detect a reflective surface by detecting a region in which the stripes move in a different direction.

In some embodiments, the 3D range estimation module 220 can be configured to detect reflective surfaces by operating a "Roberts Cross" gradient orientation filter on two horizontally adjacent image pixel elements from one of the Quadrature projection images and the corresponding two horizontally adjacent image pixel elements from the next Quadrature projection image. Since the computed orientations will be nominally oriented in one of the 45, 135, 225, 315 directions, the 3D range estimation module 22 can bin the histogram along those 4 directions. Nominally, all of the angle orientations will be in the same direction—any angle orientations going in a different direction can be considered anomalous.

Limited Depth Range

Figure 13:
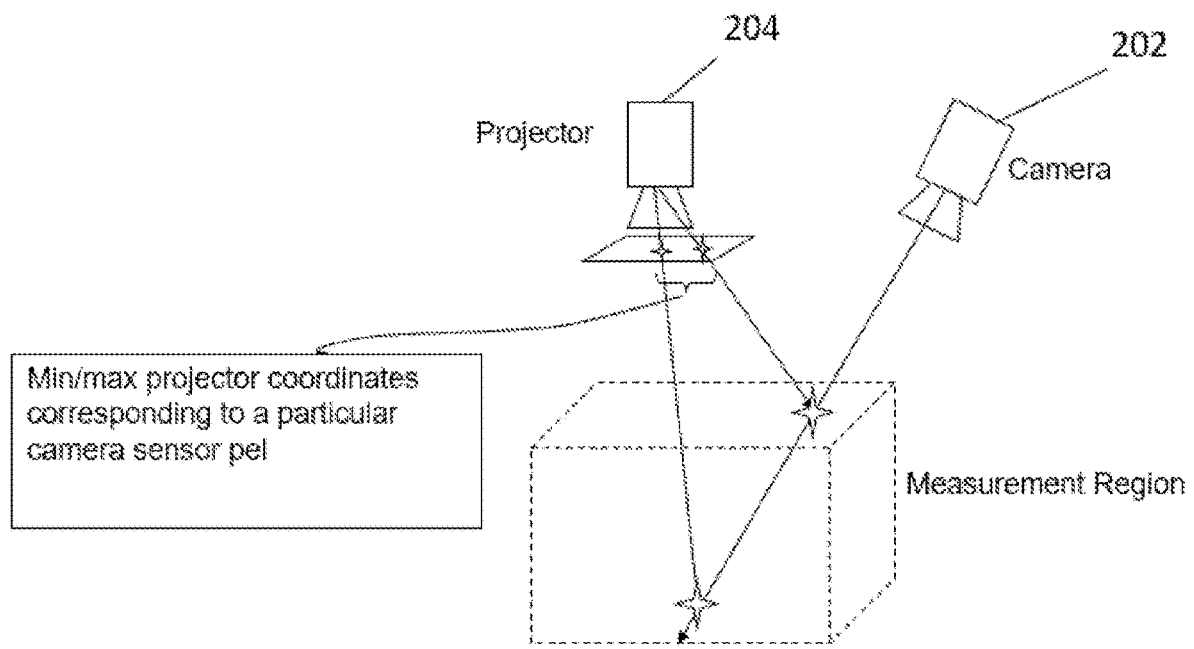
FIG. 13 shows a structured light system 200 with a limited depth range in accordance with some embodiments.

Because the image capture device(s) 202 and the projector 204 have limited depths of field, the measurement region of the structured light system 200 is limited. As a result, the projector coordinates corresponding to each image pixel element are likewise limited. FIG. 13 shows a structured light system 200 with a limited depth range in accordance with some embodiments. As shown in FIG. 13, because the measurement region is limited, the range of projector coordinates corresponding to a particular image pixel element can be limited.

In some embodiments, the 3D range estimation module 220 can take advantage of this limited projector coordinate range by ignoring higher-order Gray Code bits. For example, the 3D range estimation module 220 is configured to determine, for each image pixel element, the expected projector coordinate for the center of the measurement region. The measurement region includes a region or a volume at which both the projector 204 and the image capture device(s) 202 are in focus.

Subsequently, the 3D range estimation module 220 is configured to determine, for all image pixel elements, the maximum deviation between (1) the expected projector coordinate for the center of the measurement region and (2) the expected projector coordinate of other positions in the measurement region. To this end, the 3D range estimation module 220 can consider only the top and bottom of the measurement region for this step. In some embodiments, the 3D range estimation module 220 can receive the maximum deviation from a user.

Then the 3D range estimation module 220 is configured to determine the maximum number of bits needed to represent the maximum deviation. If the bits only need to represent the maximum deviation of 128, then the 3D range estimation module 220 can be configured to ignore all higher order bits, such as 256, 512, etc.

In some embodiments, the 3D range estimation module 220 can be configured to use one additional bit corresponding to the exclusive OR (XOR) of the higher order bits that are ignored as part of the depth measurement region constraint. For example, suppose that an encoded value can range from 0 to 2047, which should be encoded using 11 bits. However, suppose that the encoded value deviates from an expected value only by 9. In that case, the encoded value can only take on 19 different values (i.e., expected−9, expected−8, expected−7, . . . expected+7, expected+8, expected+9.) Therefore, the 3D range estimation module 220 only needs 5 bits to encode such 19 different values. In this case, the 3D range estimation module 220 is configured to use only 6 bits to encode the values (e.g., 5 bits for the 19 different values plus the XOR of bits 6-11 that would normally have been needed to model the full range (0 to 2047)) to provide all the encoding needed. To determine the encoded value from the 6 bits, the 3D range estimation module 220 can compare the decoded data with the expected value and try all possible sets of values for bits 6 through 11 at each position and use the closest one which matches the measured XOR value (e.g., the bit 6).

Multiple Exposures of Image Capture Device

Some scenes exhibit large dynamic ranges of responsivity such that there is no single exposure for which a limited dynamic-range image capture device (e.g., a 10-bit camera with 60+dB dynamic range) can measure all of the projection pixel elements within the active linear range. For such scenes, the image capture device(s) 200 can be configured to acquire multiple images per projection pattern at different exposures and then, subsequently, combine the results.

Assume, without loss of generality, that, for each exposure, the 3D range estimation module 220 has computed a set of image pixel element positions and corresponding masks. When, for a particular pixel element, only one exposure was amenable to compute a corresponding projector pixel element position, then the merged value would be obvious—the only available valid data. When, for a particular pixel element, multiple exposures were amenable to compute a corresponding projector pixel element position, then the 3D range estimation module 220 is configured to use the longest valid exposure to improve the signal-to-noise ratio. In some embodiments, the 3D range estimation module 220 can be configured to use an average or a weighted-average all valid projector coordinate values. In some embodiments, the 3D range estimation module 220 can be configured to compare (1) a valid projector coordinate corresponding to a particular image pixel element and (2) the final merged projection coordinate and, when the two differ by more than a threshold, the 3D range estimation module 220 can mark that image pixel element as invalid.

In some embodiments, the image capture device(s) 202 can be configured to determine a set of exposures to cover a large dynamic range. In some cases, the image capture device(s) 202 can set the exposures based on a geometric sequence (e.g., 0.0001 seconds, 0.001 seconds, and 0.01 seconds). The ratio between the exposures can be sufficiently small so that each region in the scene is within the sensor's linear range for at least one exposure and exhibits at least 15 dB (5 bits) of signal-to-noise. Consequently, the choice of exposures depends on the scene's range of responsivities as well as the sensor's dynamic range/signal-to-noise.

In some embodiments, the 3D range estimation module 220 can normalize the grey level data according to the exposure associated with the grey level data. Suppose there were two exposures, say at 0.0001 seconds, and another at 0.003 seconds. For image pixel elements for which the image capture device(s) 202 used the 0.0001 second exposure, the 3D range estimation module 220 can multiply the grey levels by 30 to account for the exposure difference.

In some embodiments, the 3D range estimation module 220 can merge the grey level data by simply averaging non-saturated, normalized grey levels. In other embodiments, the 3D range estimation module 220 can merge the grey level data by selecting the normalized grey level corresponding to the largest non-saturated grey level.

Two-Dimensional Mapping Between Projector Coordinate System and Image Coordinate System In some embodiments, the structured light system 200 is configured to determine a mapping between an 2D image pixel coordinate and a 1D projector coordinate. This configuration can be sufficient because a 1D projector coordinate is sufficient to determine the 3D profile image of an object of interest (e.g., a single coordinate defines a plane which can be intersected with the ray corresponding to the image pixel element).

In some embodiments, the structured light system 200 is configured to determine a mapping between a 2D image pixel coordinate and a 2D projector coordinate. To this end, the projector 204 is configured to project a plurality of projection patterns to encode 2D projector pixel element coordinate in the plurality of projection patterns. Encoding 2D projector pixel element coordinate has the advantageous because the 3D range estimation module 220 can use the 2D projector pixel element coordinate to determine when the gray coding is, perhaps, inappropriate (e.g., the ray from the projector pixel element does not intersect with the ray from the image pixel element). Encoding 2D projector pixel element coordinate has the advantageous also because the 2D projector pixel element coordinate can induce more accurate 3D positions (by virtue of providing more data).

Rendering of 3D Image

In some embodiments, the 3D range estimation module 220 is configured to render a 3D profile image from the captured input images. The 3D range estimation module 220 can use (1) the projected grey coding patterns, (2) the subpixel phase estimated from the sinusoidal gray coding patterns, (3) the merged grey scale data generated from images captured with different exposures, (4) a stereo correspondence information between image capture device(s) 202, and/or (5) the projector-image capture device calibration information to render a 3D range image.

In some embodiments, the 3D range estimation module 220 is configured to use the calibration information to determine a 3D intersection position of (1) a ray (or plane) of the projector 204 and (2) ray(s) from the image capture device(s) 202. The 3D range estimation module 220 can maintain not only the 3D intersection positions, but also the adjacencies between neighboring 3D intersection points (corresponding to adjacencies between image pixel elements). This way, the 3D range estimation module 220 can form a mesh, and generate triangular facets based on that mesh.

In some embodiments, when two projector pixel element coordinates are encoded, the 3D range estimation module 220 can compute correspondences between image pixel elements (by mapping the corresponding projector pixel elements). Furthermore, the 3D range estimation module 220 can bi-linearly interpolate the corresponding image pixel elements (again, based on the sub-pixel projector pixel element coordinates).

In some embodiments, the 3D range estimation module 220 can efficiently compute the correspondences through the projector pixel element coordinates. For example, the 3D range estimation module 220 can compute the forward/reverse lookup tables using a two-pass computation. The first pass computation involves computing the number of points mapping to the same coordinate, and then second pass computation fills in the table entries which have independent counters.

Structured Light System Calibration

As discussed above, the 3D range estimation module 220 is configured to use calibration information to generate a 3D profile image. The structured light system 200 can be configured to use a calibration module 222 to determine a correspondence between (1) projector coordinate system of the projector 204 and (2) an image coordinate system of one or more image capture devices 202.

Figure 14:
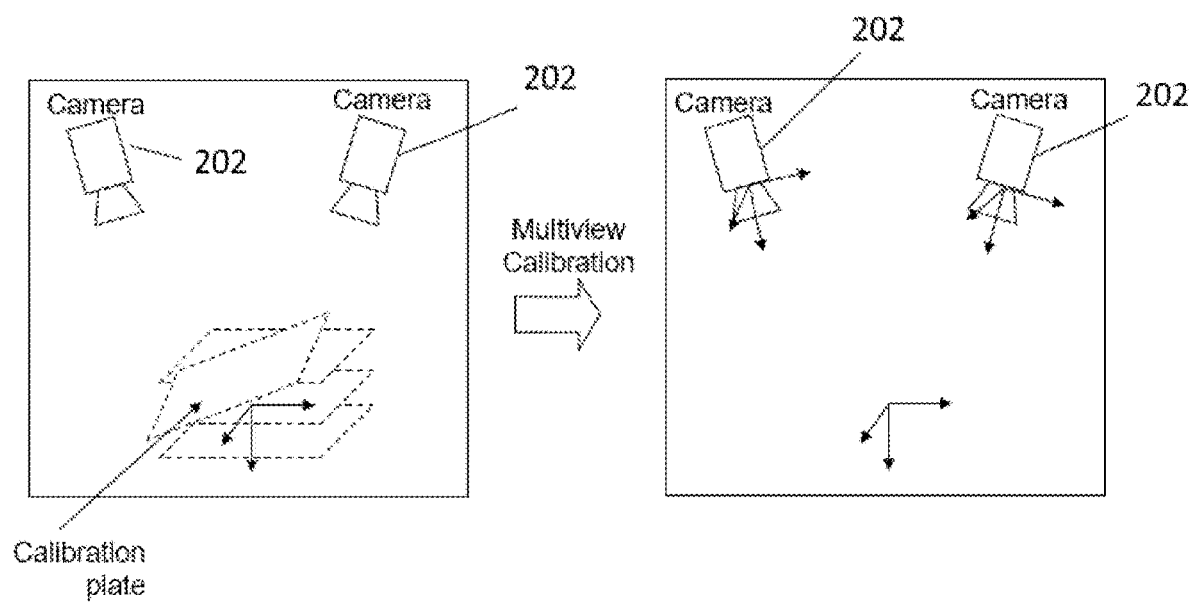
FIG. 14 illustrates a multi-view calibration of image capture devices 202 in accordance with some embodiments.

In some embodiments, the calibration module 222 can be configured to calibrate the structured light system 200 in two steps. In the first step, the calibration module 222 is configured to calibrate the image capture devices 202 using a multi-view calibration technique. FIG. 14 illustrates a multi-view calibration of image capture devices 202 in accordance with some embodiments. The image capture devices 202 can simultaneously acquire images of a calibration plate presented at different poses, possibly at elevated poses, or possibly at specified poses. Then, based on correspondences between acquired images of a calibration plate, the calibration module 222 is configured to determine the relationship between coordinate systems of the image capture devices 202. In some embodiments, the multi-view calibration of image capture devices 202 can be performed in accordance with "A Versatile Camera Calibration Techniaue for High-Accuracy 3D Machine Vision Metrology Using Off-the-shelf TV Cameras and Lenses" by Roger Tsai, IEEE JOURNAL OF ROBOTICS AND AUTOMATION, VOL. RA-3, NO. 4, AUGUST 1987, which is incorporated herein by reference in its entirety. In other embodiments, the multi-view calibration of image capture devices 202 can be performed in using camera calibration routines available from Cognex in VisionPro and CVL.

In the second step, once the calibration of the image capture devices 202 is completed, the calibration module 222 is configured to calibrate the projector 204. FIGS. 15A-15C illustrate the calibration of a projector 204 relative to the image capture devices 202 in accordance with some embodiments.

In FIG. 15A, the calibration module 222 causes the projector 204 to project a calibration pattern (e.g., a checkboard pattern) onto a matte surface (such as a piece of paper) and causes the image capture devices 202 to simultaneously acquire images of the calibration pattern. In some embodiments, the matte surface can be moved and/or tilted during the multiple acquisitions.

In FIG. 15B, the calibration module 222 can perform the feature detection on the calibration pattern. Since the calibration module 222 already knows the relationship between coordinate systems of the image capture devices 202 (the image coordinate systems), the calibration module 222 can (1) triangulate the detected features using calibrated rays from the image capture devices 202 and (2) associate the detected features with the projector coordinates. This process allows the calibration module 222 to determine the relationship between the projector coordinate system and the image coordinate systems by identifying the intersections of rays between the projector 204 and the image capture devices 202 at the detected features. In some embodiments, the calibration module 222 is configured to use triangulated intersection points only when the intersection residual (e.g., the distance between the skew lines) satisfies a distance tolerance constraint.

In FIG. 15C, the calibration module 222 can use the association between the detected features and the projector coordinates to calibrate the projector coordinate system.

Sub-Pixel Projector Coordinate Estimation

In some embodiments, the structured light system 200 includes a projector 204 and a single image capture device 202. Even in such embodiments, the structured light system 200 can estimate the correspondence between the coordinate system of the projector 204 and the coordinate system of the single image capture device 202, without separate calibration of the projector 204 and the image capture device 202.

In some embodiments, the 3D range estimation module 220 is configured to receive a sequence of images, captured by the image capture device 202, where each image corresponds to a projection pattern projected by the projector 204. Based on the sequence of images, the 3D range estimation module 220 is configured to determine, for each image pixel element, (1) the sub-pixel projector coordinate position (u, v) corresponding to the image pixel element, (2) the albedo (e.g., grayscale value) corresponding to that acquired image pixel element, and/or (3) a Boolean value indicating whether the projector position (u, v) and albedo values are valid.

In some embodiments, the 3D range estimation module 220 is configured to determine the sub-pixel projector coordinate position (u, v) corresponding to the image pixel element using two processes. First, the 3D range estimation module 220 is configured to use a "Gray Code" process which provides a coarse, full-pixel projector coordinate. Second, the 3D range estimation module 220 is configured to refine the coarse, full-pixel projector coordinate using a phase unwrapping process to determine a fine, sub-pixel projector coordinate. In some embodiments, this two-step process can measure the two-dimensional projector coordinate position (u, v). In other embodiments, this two-step process can measure only a single coordinate (u or v) of the projector coordinate position (u, v). This embodiment can be useful for determining a 3D profile image since a 3D profile image of a scene can be determined when the structured light system 200 has a correspondence between an image pixel element and a single coordinate (u or v) of the projector coordinate position (u, v).

In some embodiments, the image capture device 202 is configured to acquire sequence of images of the plane of interest 210. In some cases, the image capture device 202 can be configured to capture the sequence of images at a rate of 250 frames per second, 500 frames per second, and/or at other rates (e.g., depending on the capability of the image capture device 202).

In some embodiments, the image capture device 202 is configured to capture one or more of three types of images: (1) high frequency quadrature images, (2) phase coded Gray Code images, and (3) greylevel coded Gray Code image(s). The motivation for using the greylevel coded Gray Code image(s) is that the next-to-highest frequency bit of the Gray code may not be well encoded by phase coding due to the relatively high frequency changes of the phase coding. The greylevel coded Gray Code image(s) can be classified using thresholds based on the high frequency images.

In some embodiments, the image capture device 202 is configured to capture one or more of four types of images: (1) high frequency quadrature images, (2) phase coded Gray Code images, (3) white and black images, and (4) greylevel coded Gray Code images. The motivation for using the greylevel coded Gray Code image(s) is that the next-to-highest frequency bit of the Gray code may not be well encoded by phase coding due to the relatively high frequency changes of the phase coding. The greylevel coded Gray Code image(s) can be classified using thresholds based on the white and black images.

Figure 16:
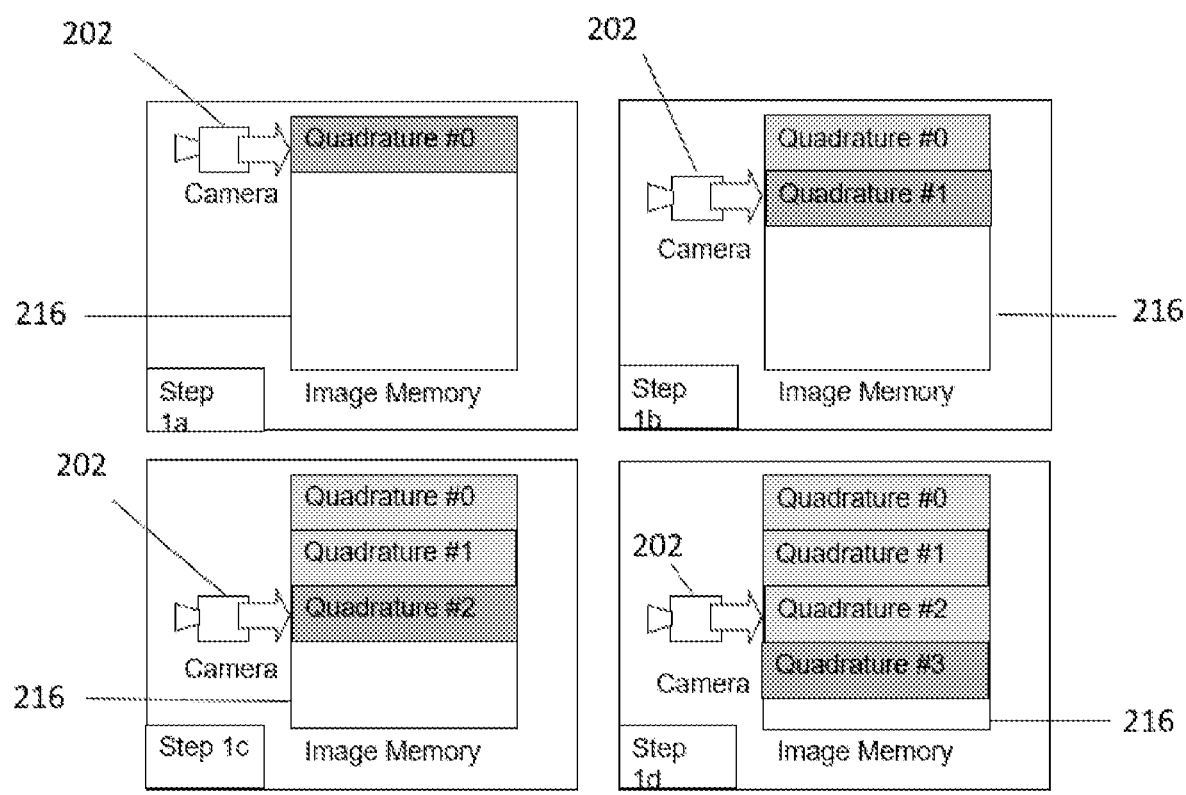
FIG. 16 illustrates the storage of quadrature images in an image memory device in accordance with some embodiments.
Figure 17:
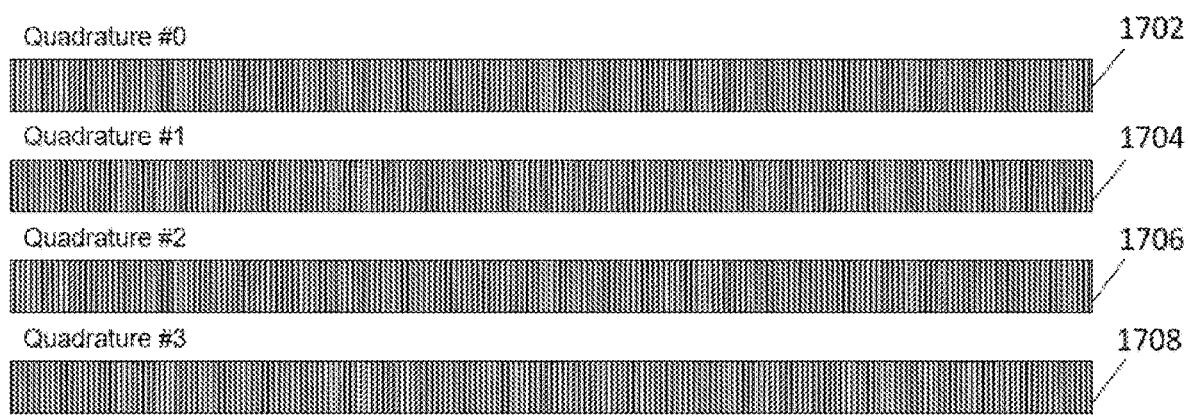
FIG. 17 illustrates four high frequency quadrature images shifted in phase by a quadrature in accordance with some embodiments.

In some embodiments, the image capture device 202 can capture four high frequency quadrature images and store them in an image memory device 216. The storage of the quadrature images in the image memory device 216 is illustrated in FIG. 16 in accordance with some embodiments. In step 1a, the image capture device 202 stores the first quadrature image at a first position of the image memory device 216; in step 1b, the image capture device 202 stores the second quadrature image at a second position of the image memory device 216; in step 1c, the image capture device 202 stores the third quadrature image at a third position of the image memory device 216; and in step 1d, the image capture device 202 stores the fourth quadrature image at a fourth position of the image memory device 216. FIG. 17 illustrates four high frequency quadrature images 1702, 1704, 1706, 1708 shifted in phase by 90 degrees in accordance with some embodiments. Each quadrature image (for example, the image 1702) is phase-shifted from a subsequent quadrature image (for example, the image 1704) (e.g., the vertical lines are horizontally shifted) by a predetermined phase, in this case ¼ of a period.

Once the image capture device 202 stores all quadrature images in the memory device 216, the 3D range estimation module 220 can be configured to process the four quadrature images to compute the subpixel phase position. For example, the projector projects many periods of sinusoidal period (e.g., quadrature images) through the scene and the 3D range estimation module 220 receives images of the sinusoidal period. The 3D range estimation module 220 is configured to use the quadrature images to determine the phase information and the 3D range estimation module 220 is configured to use Gray coding to determine the sinusoidal period. Subsequently, the 3D range estimation module 220 is configured to combine the period number supplied by the Gray code with the phase information provided by the quadrature images to determine period and phase of the sinusoid for each image pixel element. Since the 3D range estimation module 220 already has the correspondence between the image pixel element and the projector pixel element (e.g., from the calibration of the image capture device and the projector), the 3D range estimation module 220 can be configured to convert the image pixel element position into a physically calibrated 3D ray and the projector pixel element(s) into either a physically calibrated 3D sheet or a physically calibrated 3D ray. The 3D range estimation module 220 can subsequently intersect the physically calibrated 3D ray of the image pixel element and the physically calibrated 3D sheet or the physically calibrated 3D ray of the projector pixel element(s) to determine the 3D profile for the particular image pixel element.

Figure 18:
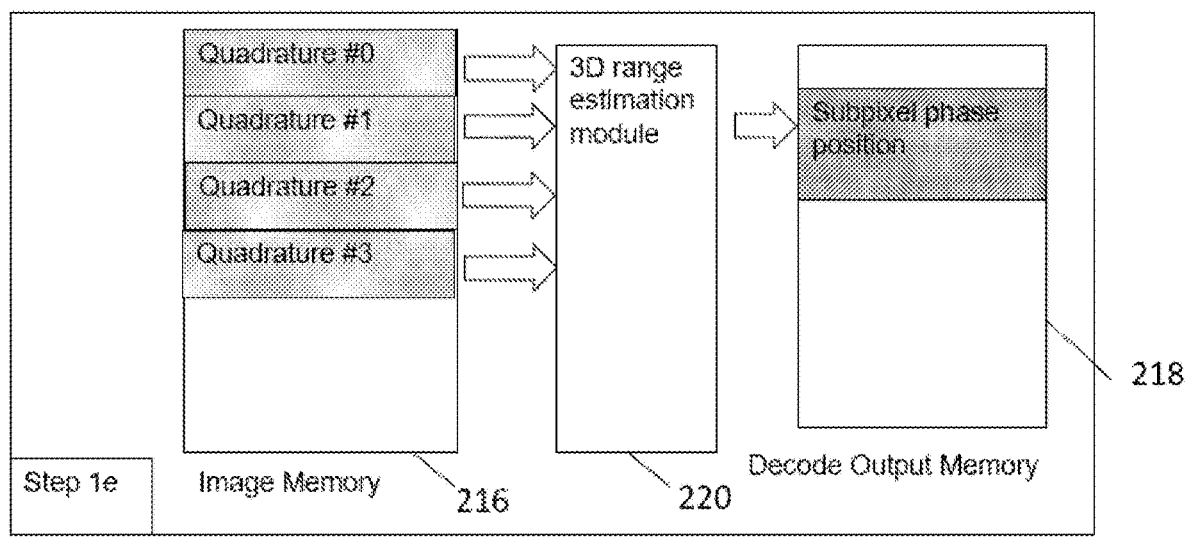
FIG. 18 illustrates the processing of four quadrature images in accordance with some embodiments.

FIG. 18 illustrates the processing of the four quadrature images in accordance with some embodiments. The 3D range estimation module 220 can be configured to store the subpixel phase in a decode output memory 218. In some embodiments, the 3D range estimation module 220 can be configured to compute the subpixel phase at any time after receiving the four quadrature images.

Figure 19:
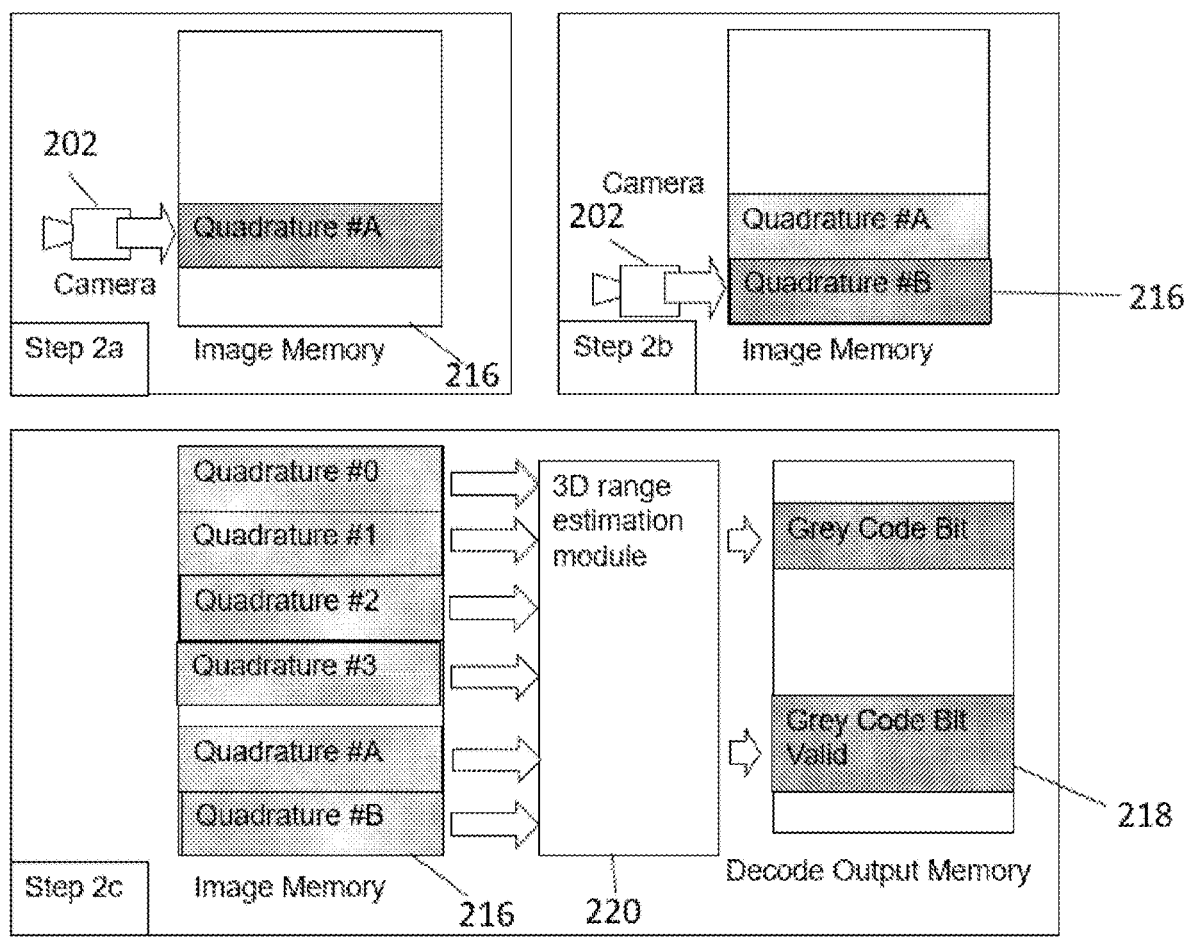
FIG. 19 illustrates the storage and processing of quadrature phase-coded Gray Code images in accordance with some embodiments.

In some embodiments, the image capture device 202 can also capture one or more pairs of quadrature phase-coded Gray Code images and store them in the image memory device 216. The storage and processing of the quadrature phase-coded Gray Code images are illustrated in FIG. 19 in accordance with some embodiments.

For example, in step 2a, the image capture device 202 stores the first phase-coded Gray code image at a fifth position of the image memory device 216; and in step 2b, the image capture device 202 stores the second phase-coded Gray code image at a sixth position of the image memory device 216.

Figure 20:
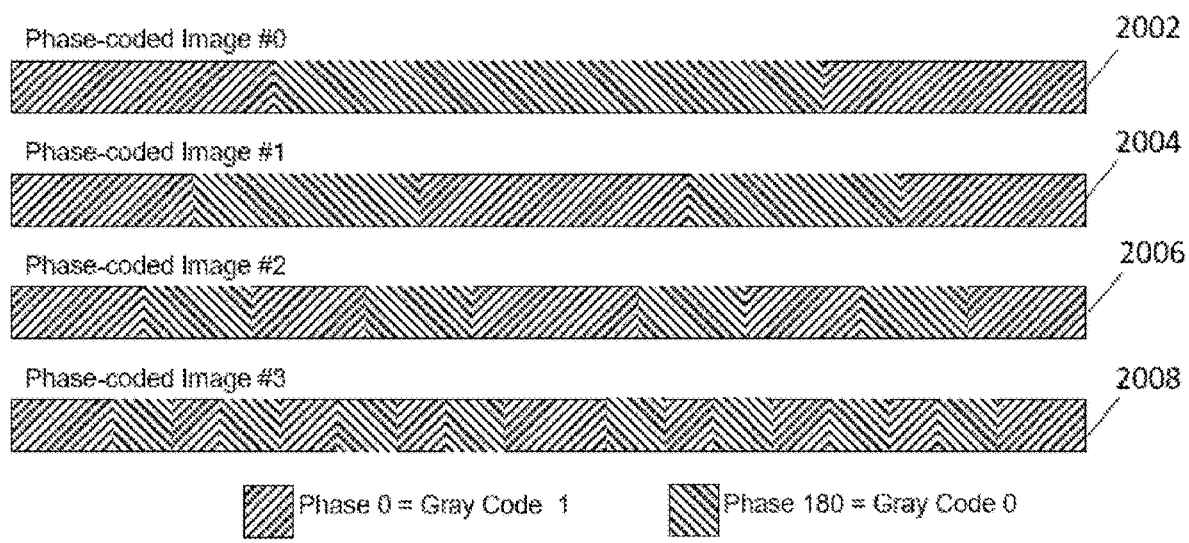
FIG. 20 illustrates phase-coded Gray code images in accordance with some embodiments.

In some cases, the phase-coded Gray code images can include a sequence of sinusoidal patterns. FIG. 20 illustrates phase-coded Gray code images 2002, 2004, 2006, 2008 in accordance with some embodiments. Each pixel element in a phase-coded Gray code image represents a particular phase, and the phase can encode binary bit information. In FIG. 20, the sinusoidal phase offset at each position depends on the Gray code. For example, for positions where the Gray code bit is 1, the sinusoidal signal phase is 0 degrees, and for positions where the Gray code bit is 0, the sinusoidal signal phase is 180 degrees. The projector value at a projector pixel x can be $\cos(2PI*(x/8)+(1-GrayCode(x))*PI)$. Note that the approach projects phase-coded Gray code patterns in pairs, so the projector pixel value for the next corresponding image can be $\cos(PI/2+2PI*(x/8)+(1-GrayCode(x))*PI)$.

In some embodiments, a sequence of phase-coded Gray code images can encode a sequence of binary bits corresponding to a particular Gray code. When each bit is represented in quadrature, the image capture device 202 can capture two sinusoidal patterns for each bit to determine the phase.

Subsequently, in step 2c, the 3D range estimation module 220 can be configured to process the pair of phase-coded Gray code images to determine (1) the Gray code bit and (2) a validity Boolean bit indicating whether the Gray code bit is valid or not. The (1) the Gray code bit and (2) a validity Boolean bit can be stored in the decode output memory 218.

In some embodiments, the 3D range estimation module 220 is configured to determine (1) the Gray code bit and (2) a validity Boolean bit by comparing each pair of Gray Code quadrature images (PelA, PelB) with the four corresponding high frequency quadrature images (QuadA, QuadB, QuadA', QuadB') captured previously. "A", "A'", "B", "B'" refer to a phase position within the phase-coded Gray code images. In particular, the phase position of "A", "A'", "B", "B'" is set to be as follows:

TABLE 1

| Name | Angle | Angle Offset |
|------|-------|--------------|
| A | α | 0 |
| A' | α + 180 | 180 |
| B | β | 90 |
| B' | β + 180 | 270 | where α and β are predetermined phases. The terms A and B refer to two signals 90 degrees out of phase. The table 1 presents that the phase-coded Gray code can be presented with two signals, either A and B or A' and B', and that if the signals are A and B, then the phase of the two samples will be 0 and 90, but if the signals as A' and B', then the phase of the two samples will be 180 and 270. In order to determine whether the 3D range estimation module 220 is observing A and B or A' and B', the 3D range estimation module 220 is configured to compare the two samples with known samples at 0, 90, 180, 270 to determine which pair (A,B) or (A',B') better match the given sample In some embodiments, the 3D range estimation module 220 is configured to determine the Gray code bit and the validity Boolean bit for each image pixel element by computing the following features for each image pixel element:

QuadratureDiff=|QuadA−Quad'A|+|QuadB−Quad'B|
Phase0Diff=|PelA−QuadA|+|PelB−QuadB|
Phase180Diff=|PelA−Quad'A|+|PelB−Quad'B|

From these features, the 3D range estimation module 220 is configured to determine (1) the Gray code bit and (2) a validity Boolean bit as follows:

Gray code bit=(Phase0Diff<Phase180Diff ? 1:0)
Validity Boolean bit=(|Phase0Diff−Phase180Diff|>k*QuadratureDiff) & (max(Phase0Diff, Phase180Diff)>thresh)

In some embodiments, the 3D range estimation module 220 can predetermine the constant values "k" and "thresh."

In some embodiments, the structured light system 200 can perform the process illustrated in FIG. 19 multiple times in order to determine the grey-coded value for each image pixel element. For example, when the Gray coded value for an image pixel element involves 8 bits of encoding, then the structured light system 200 can perform the process illustrated in FIG. 19 8 times.

In some embodiments, the image capture device 202 can also capture one or more all-on and all-off images and store them in the image memory device 216. An all-on image refers to an image of a projection pattern for which all projector pixel elements are in an "on" state. An all-off image refers to an image of a projection pattern for which all projector pixel elements are in an "off" state.

Figure 21:
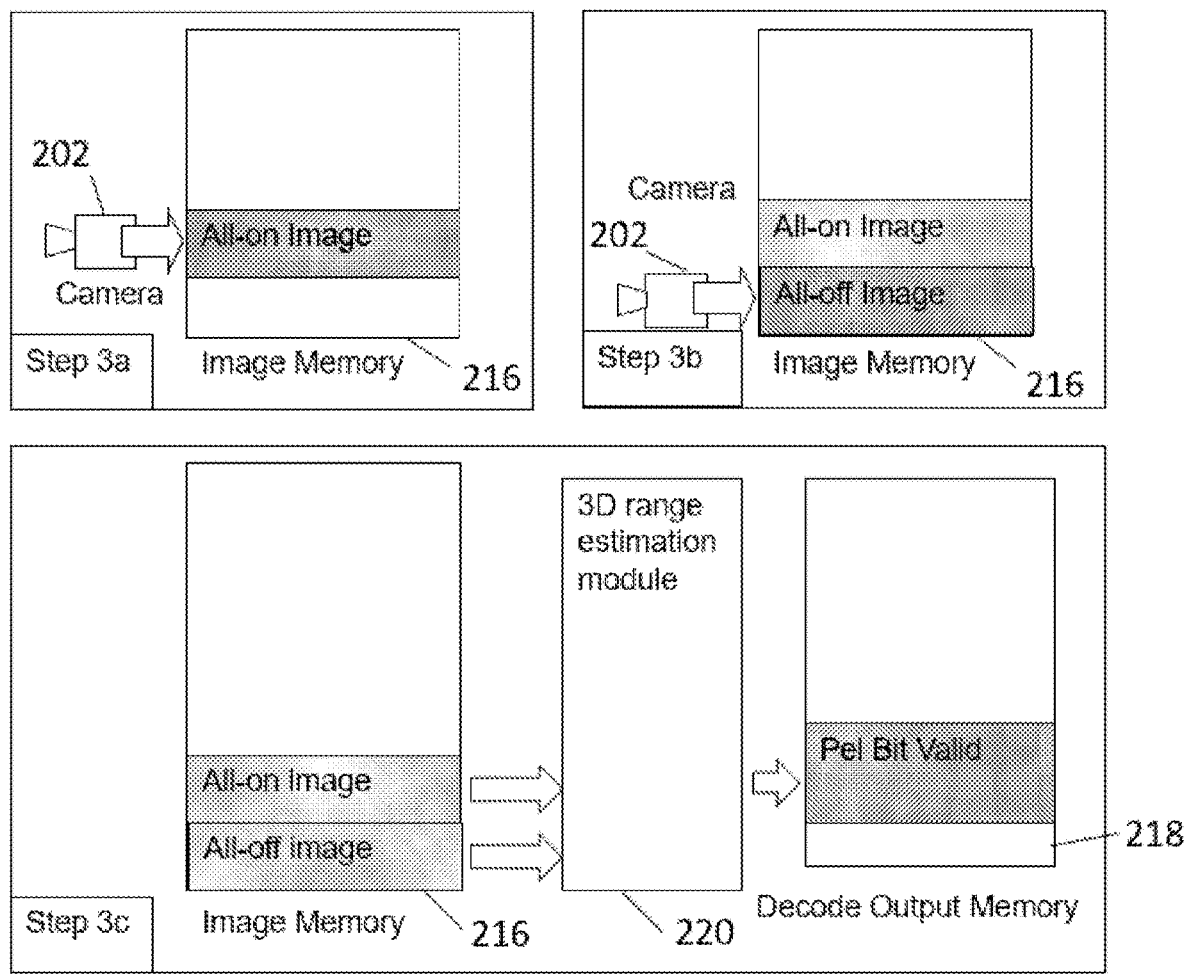
FIG. 21 illustrates the storage and processing of all-on and all-off images in accordance with some embodiments.

The storage and processing of the all-on and all-off images are illustrated in FIG. 21 in accordance with some embodiments. For example, in step 3a, the image capture device 202 stores the all-on image at a seventh position of the image memory device 216; and in step 3b, the image capture device 202 stores the all-off image at a sixth position of the image memory device 216. Subsequently, in step 3c, the 3D range estimation module 220 can compare the value of the all-on image and an all-off image for each image pixel element to determine whether each image pixel element is valid, and store the validity bit in the decode output memory 218.

To determine the validity bit, the 3D range estimation module 220 can determine a first value of an image pixel element that captures an all-on image. The 3D range estimation module 220 can also determine a second value of an image pixel element that captures an all-off image. Subsequently, the 3D range estimation module 220 can compute the difference between the first value and the second value. If the difference is too low, the 3D range estimation module 220, the 3D range estimation module 220 can determine that the image pixel element is invalid.

In some embodiments, the image capture device 202 can also capture a pair of greylevel Gray code images and store them in the image memory device 216. In some cases, the pair of greylevel Gray code images can include greylevel Gray code images that are inverses of one another. Subsequently, the 3D range estimation module 220 is configured to process the pair of greylevel Gray code images and the all-on/all-off images to determine (1) the Gray code bit corresponding to the pair of greylevel Gray code images for each image pixel element and (2) a validity Boolean bit indicating whether the Gray code bit is valid.

In some embodiments, the 3D range estimation module 220 can determine the Gray code bit and the validity Boolean bit in one of two mechanisms: (1) using a fixed binarization threshold based on the all-on/all-off images, or (2) acquiring two images (an image and its inverse) and comparing them. When the 3D range estimation module 220 uses the first mechanism, the 3D range estimation module 220 can determine the Gray code bit from a single Gray code image. Therefore, the first mechanism can be simpler and faster compared to the second mechanism. When the 3D range estimation module 220 uses the second mechanism, the 3D range estimation module 220 requires two input Gray code images, but the second mechanism tends to be more robust.

In the first mechanism, the 3D range estimation module 220 can determine the fixed binarization threshold for each pixel independently using two input mages: (1) an image of an all-on projection pattern, hereinafter $Im_{ON}$ and (2) an image of an all-off projection pattern, hereinafter $Im_{OFF}$. For an image pixel element at coordinate (i, j), the threshold can be computed as follows:

$$threshold(i,j)=(Im_{ON}(i,j)+Im_{OFF}(i,j)+1)/2$$

In some embodiments, the 3D range estimation module 220 can use a differentiation threshold. The differentiation threshold can be used for a 8-on/8-off acquisition wherein the image capture device 202 performs two acquires—one of an 8-on/8-off pattern, and then one of its inverse. The differentiation threshold indicates the maximum difference between the greylevel and the threshold within which the image pixel element is considered valid. For each Gray Coding, at most one bit (of the topmost bits) may be non-valid; otherwise, the 3D range estimation module 220 can consider the Gray Coding invalid. In some embodiments, the 3D range estimation module 220 can set the differentiation threshold as follows:

$$DiffThreshold(i,j)=(Im_{ON}(i,j)-Im_{OFF}(i,j)+1)/k$$

where k is a predetermined constant.

In some embodiments, the 3D range estimation module 220 can indicate that an image pixel is brightness saturated and hence invalid. For example, in $Im_{ON}$, every acquired image pixel element that is brightness saturated can be marked as invalid. In some example, (1) every acquired image pixel element that is brightness saturated and (2) its adjacent image pixel elements can be marked as invalid.

In some embodiments, the 3D range estimation module 220 can indicate that an image pixel with low contrast is invalid. For example, the 3D range estimation module 220 can indicate that a pixel is invalid when the following condition is satisfied:

$$(Im_{ON}(i,j)-Im_{OFF}(i,j)+1)<ContrastThreshold$$

where ContrastThreshold is a predetermined constant.

In some embodiments, the 3D range estimation module 220 can be configured to determine the Gray code bit by comparing an input Gray code image, InputIm (i, j), with a threshold image, threshold (i, j), pixel-wise. For example, when InputIm (i, j)>threshold(i, j), the Gray code bit for that pixel (i, j) is one; when InputIm (i, j)<=threshold(i, j), the Gray code bit for that pixel (i, j) is zero.

In some embodiments, the 3D range estimation module 220 can be configured to determine the validity Boolean bit by comparing the difference of the input image and the threshold image against the Diff Threshold image. For example, when (InputIm (i, j)−threshold(i, j)) is greater than or equal to DiffThreshold (i, j), then that pixel (i, j) is valid; when (InputIm (i, j)−threshold(i, j)) is less than DiffThreshold (i, j), then that pixel (i, j) is invalid.

Figure 22:
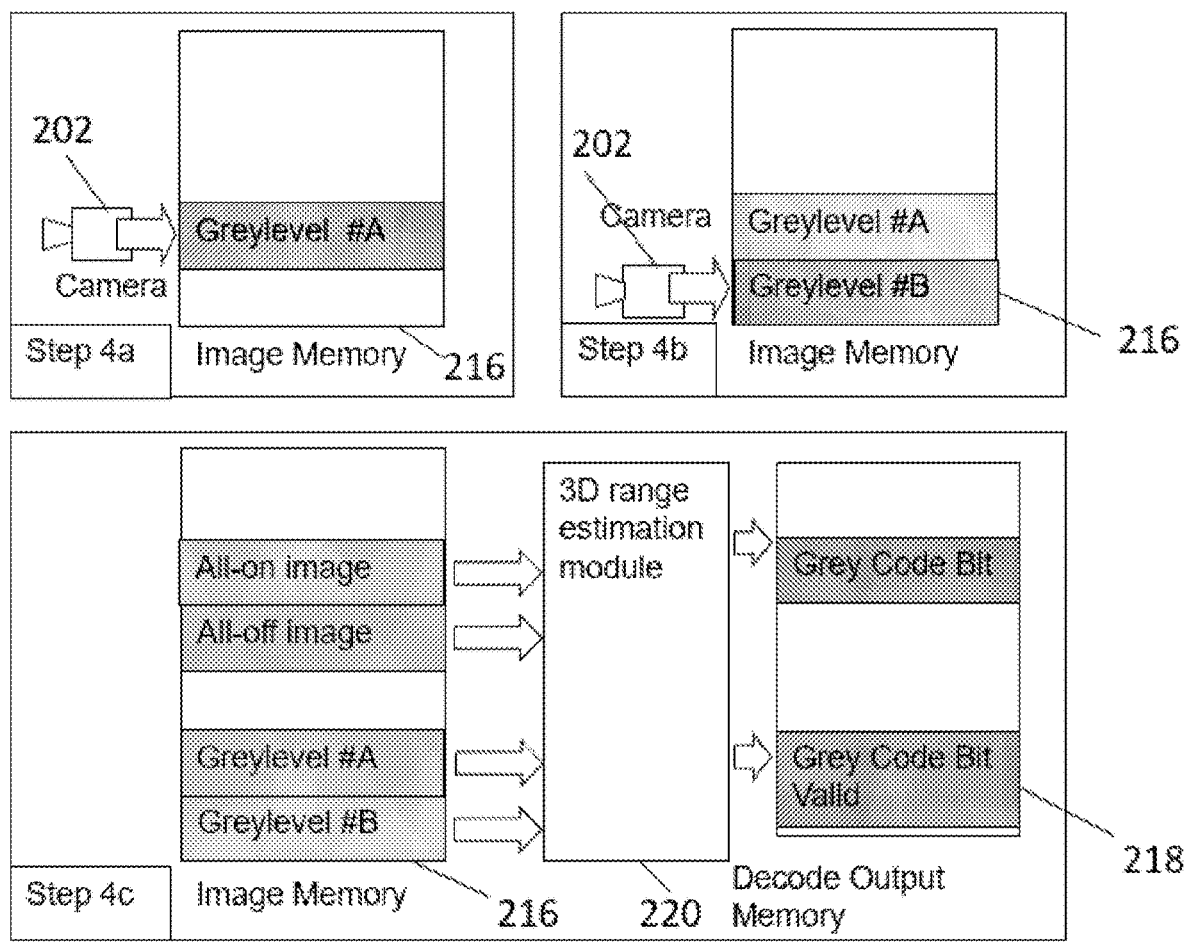
FIG. 22 illustrates the storage and processing of greylevel Gray code images and all-on/all-off images in accordance with some embodiments.

The storage and/or processing of the pair of greylevel Gray code images and the all-on/all-off images are illustrated in FIG. 22 in accordance with some embodiments. For example, in step 4a, the image capture device 202 stores a first grey-code Gray code image at a ninth position of the image memory device 216; and in step 4b, the image capture device 202 stores a second grey-code Gray code image at a tenth position of the image memory device 216. Subsequently, in step 4c, the 3D range estimation module 220 can process the pair of greylevel Gray code images and the all-on/all-off images to determine (1) the Gray code bit corresponding to the pair of greylevel Gray code images for each image pixel element and (2) a validity Boolean bit indicating whether the Gray code bit is valid.

In some embodiments, the structured light system 200 can perform the process illustrated in FIG. 22 multiple times in order to determine the grey-coded value for each image pixel element. For example, when the Gray coded value for an image pixel element involves 8 bits of encoding, then the structured light system 200 can perform the process illustrated in FIG. 22 8 times.

Figure 23:
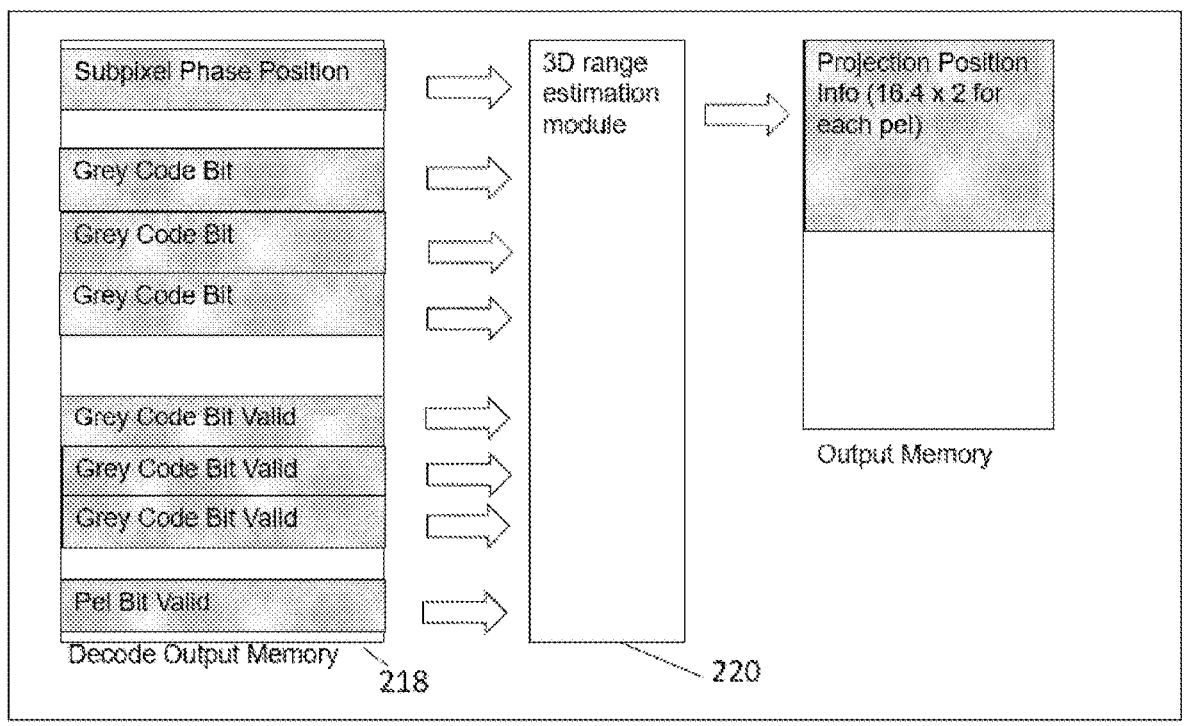
FIG. 23 illustrates a system in which the input capture device provides input quadrature images directly to the 3D range estimation module in accordance with some embodiments.

In some embodiments, in one or more examples provided above, the input capture device 202 can provide the input quadrature images directly to the 3D range estimation module 220, bypassing the image memory 216. FIG. 23 illustrates a system in which the input capture device provides input quadrature images directly to the 3D range estimation module in accordance with some embodiments.

Once (1) the subpixel phase position, (2) Gray Code bits corresponding to a sequence of input Gray code images, (3) validity Boolean bits corresponding to the sequence of input Gray code images, and (4) validity Boolean bits for the projector pixel element (Pel Bit Valid) are available in the decode output memory device 218, the information in the decode output memory device 218 can be processed to determine the (1) the sub-pixel projector coordinate position (u, v) corresponding to the image pixel element, (2) the albedo (e.g., grayscale value) corresponding to that acquired image pixel element, and/or (3) a Boolean value indicating whether the projector position (u, v) and albedo values are valid. In some embodiments, the information in the decode output memory device 218 can be processed by the 3D range estimation module 220; in other embodiments, the information in the decode output memory device 218 can be processed by another computing system in communication with the 3D range estimation module 220. If the information in the decode output memory device 218 is processed by the 3D range estimation module 220, the 3D range estimation module 220 can also combine the phase shift data and the Gray Code data and output subpixel projection position information in fixed point format. In some cases, the fixed format can be, for example, 16-bits of data where 12 bits characterize the integer value and 4 bits characterize the fractional value. In some cases, the fixed format can be, for example, 16-bits of data where 12 bits characterize the integer value and 4 bits characterize the fractional value. In some cases, the fixed format can be, for example, the integer value 15621 corresponding to fixed-point format with 4 bits of fractional value corresponds to 15621/16, or 976.3125.

In some embodiments, the 3D range estimation module 220 can determine the subpixel position from the measured phase of the projected sinusoid. For example, the phase-shifting technique involves projecting patterns at various known phase offsets and analyzing measurements to determine the phase corresponding to a sample point. For example, some phase-shifting approaches project patterns at four phase offsets—0 degrees, 90 degrees, 180 degrees, and 270 degrees, and then compute the phase by analyzing the measured values corresponding to those four offsets. In another example, some phase-shifting approaches project patterns at eight phase offsets—0 degrees, 45 degrees, 90 degrees, 135 degrees, 180 degrees, 225 degrees, 270 degrees, and 315 degrees, and then compute the phase by analyzing the measured values corresponding to those eight offsets.

When analyzing four temporal measurements of the projected pattern shifted by 0, 90, 180 and 270 degrees, the 3D range estimation module 220 can compute a "cosine" value by computing pel[A']−pel[A] and a "sine" value by taking pel[B']− pel[B], where A, A', B, and B' are defined as previously provided in Table 1. Subsequently, the 3D range estimation module 220 can compute the phase by computing the atan 2 of the "cosine" value and the "sine" value.

In some embodiments, when there are eight subpixel phase measurements (at every 45 degrees), the computed values are pel[A']−pel[A]+√½ *(pel[BA]−pel[BA']+pel[AB']−pel[AB]) and pel[B']−pel[B]+√½ *(pel[AB]−pel[AB']+pel[BA']−pel[BA]) where AB is halfway from A to B and BA is halfway from B to A. The terms A, AB, B, BA, A' AB', B', BA' refer to the measured values corresponding to phase offsets of 0 degrees, 45 degrees, 90 degrees, 135 degrees, 180 degrees, 225 degrees, 270 degrees, and 315 degrees.

Figure 24A:
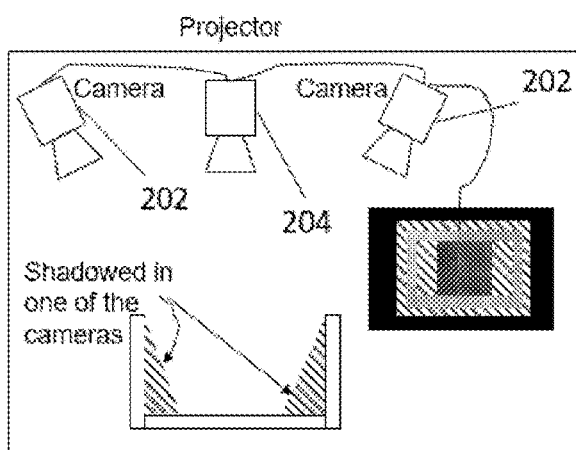
FIGS. 24A-24B show a comparison of a single camera structured light system and a stereo camera structured light system in accordance with some embodiments.
Figure 24B:
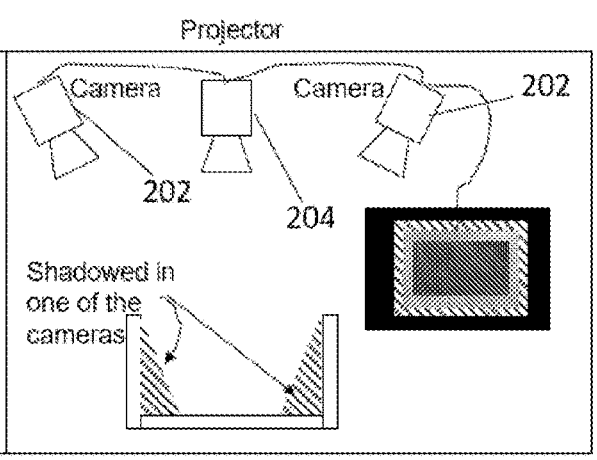

The ability to determine the correspondence between a projector coordinate and a camera coordinate even with a small camera is that the structured light system 200 can determine the depth information even in regions that could not have been determined using a stereo camera system. FIGS. 24A-24B show a comparison of a single camera structured light system and a stereo camera structured light system in accordance with some embodiments. In both FIGS. 24A-24B, the patterned regions indicate the area in which the depth information is not available. As indicated in FIG. 24A, a stereo camera structured light system has a large region in which the depth information is not available. This is because a stereo camera structured light system requires both image capture devices to see a region in order for the stereo camera structured light system to estimate depth information for that region. In contrast, as indicated in FIG. 24B, a single camera structured light system only has a small region in which the depth information is not available. This is because the single camera structured light system can estimate depth information even where only one image capture device can see the region.

Inter-Reflection Mitigation

The inter-refection process has the effect of low pass filtering the reflected projection patterns. Greylevel-based Gray coding inter-reflects large swaths of white/black regions as other swaths of white/black regions, and this inter-reflection effect of greylevel-based Gray Coding can confuse the decoding.

Figure 25A:
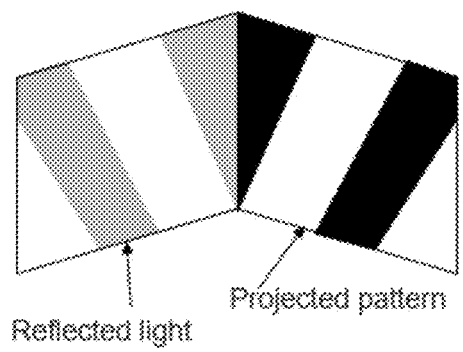
FIGS. 25A-25B show an interreflection effect on a low frequency projection pattern which would likely appear in the reflection (which may cause decoding error), and a high frequency projection pattern, which may be reflected with lower contrast (which causes less decoding error), in accordance with some embodiments.
Figure 25B:
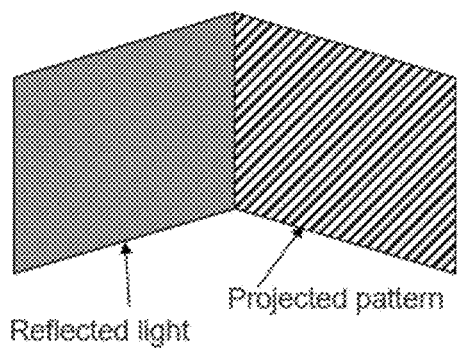

In some embodiments, the structured light system 200 can reduce the decoding error associated with inter-reflective objects by using high frequency projection patterns, as opposed to the low-frequency projection patterns, because the inter-reflected high frequency pattern would likely be filtered out by the low pass filtering process. FIGS. 25A-25B show an interreflection effect on a low frequency projection pattern (FIG. 25A) and a high frequency projection pattern (FIG. 25B) in accordance with some embodiments.

In some embodiments, the structured light system 200 can reduce the decoding error associated with inter-reflective objects by using phase-coded Gray code images. The advantage of the phase-based Gray coding is that it overcomes the issue of interreflective surfaces. Phase-based Gray coding suffers less from such incorrect decodings because the spatial high frequency illumination signals are usually inter-reflected as mixed, and reflected as relatively uniform illumination. In some cases, the phase-coded Gray code images are used for highest frequency component only. The other frequency components in the Gray code images can use simple greylevel-based Gray code images.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system comprising:
    at least one processor configured to:
        receive, from one or more image capture devices, an image of a blurred projection pattern projected onto an object of interest in a scene, wherein the blurred projection pattern comprises a projection pattern blurred by an optical element in a light path between a projector of the projection pattern and the object of interest; and
        generate a three-dimensional profile of the object of interest from the image based on calibration information of the projector and the one or more image capture devices.

2. The system of claim 1, wherein generating the three-dimensional profile of the object of interest comprises detecting a reflective surface on the object of interest to avoid a false depth measurement induced by the reflective surface on the object of interest, wherein the false depth measurement does not correspond to a position in the scene.

3. The system of claim 2, wherein detecting the reflective surface on the object of interest comprises detecting a region in the image in which the blurred projection pattern moves in a direction different from a remainder of the image.

4. The system of claim 1, wherein:
    the projection pattern comprises a Gray code binary projection pattern comprising a first intensity level and a second intensity level, wherein the Gray code binary projection pattern comprises a periodic square-wave pattern having a sharp edge between the first intensity level and the second intensity level, wherein the optical element blurs the sharp edge between the first intensity level and the second intensity level to provide the blurred projection pattern comprising a sinusoidal projection pattern; and the one or more image capture devices captures the image of the blurred projection pattern comprising the sinusoidal projection pattern.

5. The system of claim 4, wherein the processor is further configured to:
determine a correspondence between an image coordinate system and a projector coordinate system;
determine, for an image pixel element in the image, a projector pixel element of the projector coordinate system corresponding to the image pixel element; and
determine, for the image pixel element in the image, a binary value of the first blurred periodic projection pattern at the image pixel element.

6. The system of claim 1, wherein:
the projected pattern comprises a first periodic projection pattern and a second periodic projection pattern, wherein the second periodic projection pattern is phase-shifted from the first periodic projection pattern;
the optical element provides, from the first projection pattern, a first blurred periodic projection pattern, and provides, from the second projection pattern, a second blurred periodic projection pattern; and
the one or more image capture devices capture a first image of the first blurred periodic projection pattern and a second image of the second blurred periodic projection pattern.

7. The system of claim 6, wherein the processor is further configured to:
determine a correspondence between an image coordinate system and a projector coordinate system;
determine, for an image pixel element in the first image, a phase of the first blurred periodic projection pattern at the image pixel element; and
determine, for the image pixel element in the first image, a sub-pixel position of the projector coordinate system corresponding to the image pixel element.

8. The system of claim 1, wherein the one or more image capture devices includes a Scheimpflug image capture device comprising Scheimpflug optics comprising a lens whose plane is not parallel to a plane of the image.

9. The system of claim 8, wherein the Scheimpflug image capture device increases a measurement region where both the projector and the Scheimpflug image capture device are in focus and reduces observation differences between the projector and the Scheimpflug image capture device compared to an optical configuration that is parallel to the plane of the image, thereby improving accuracy in generating the three-dimensional profile of the object of interest.

10. The system of claim 8, wherein the Scheimpflug image capture device reduces false depth observations compared to an optical configuration that is parallel to the plane of the image, wherein the false depth observations correspond to measurements in the three-dimensional profile of the object of interest which do not correspond to positions in the scene.

11. A method comprising:
receiving, from one or more image capture devices, an image of a blurred projection pattern projected onto an object of interest in a scene, wherein the blurred projection pattern comprises a projection pattern blurred by an optical element in a light path between a projector of the projection pattern and the object of interest; and generating a three-dimensional profile of the object of interest from the image based on calibration information of the projector and the one or more image capture devices.

12. The method of claim 11, wherein generating the three-dimensional profile of the object of interest comprises detecting a reflective surface on the object of interest to avoid a false depth measurement induced by the reflective surface on the object of interest, wherein the false depth measurement does not correspond to a position in the scene.

13. The method of claim 12, wherein detecting the reflective surface on the object of interest comprises detecting a region in the image in which the blurred projection pattern moves in a direction different from a remainder of the image.

14. The method of claim 11, wherein:
the projection pattern comprises a Gray code binary projection pattern comprising a first intensity level and a second intensity level, wherein the Gray code binary projection pattern comprises a periodic square-wave pattern having a sharp edge between the first intensity level and the second intensity level, wherein the optical element blurs the sharp edge between the first intensity level and the second intensity level to provide the blurred projection pattern comprising a sinusoidal projection pattern; and
the one or more image capture devices captures the image of the blurred projection pattern comprising the sinusoidal projection pattern.

15. The method of claim 14, further comprising:
determining a correspondence between an image coordinate system and a projector coordinate system;
determining, for an image pixel element in the image, a projector pixel element of the projector coordinate system corresponding to the image pixel element; and
determining, for the image pixel element in the image, a binary value of the first blurred periodic projection pattern at the image pixel element.

16. The method of claim 11, wherein:
the projected pattern comprises a first periodic projection pattern and a second periodic projection pattern, wherein the second periodic projection pattern is phase-shifted from the first periodic projection pattern;
the optical element provides, from the first projection pattern, a first blurred periodic projection pattern, and provides, from the second projection pattern, a second blurred periodic projection pattern; and
the one or more image capture devices capture a first image of the first blurred periodic projection pattern and a second image of the second blurred periodic projection pattern.

17. The method of claim 16, further comprising:
determining a correspondence between an image coordinate system and a projector coordinate system;
determining, for an image pixel element in the first image, a phase of the first blurred periodic projection pattern at the image pixel element; and
determining, for the image pixel element in the first image, a sub-pixel position of the projector coordinate system corresponding to the image pixel element.

18. The method of claim 11, wherein the one or more image capture devices includes a Scheimpflug image capture device comprising Scheimpflug optics comprising a lens whose plane is not parallel to a plane of the image.

19. The method of claim 18, wherein the Scheimpflug image capture device increases a measurement region where both the projector and the Scheimpflug image capture device are in focus and reduces observation differences between the projector and the Scheimpflug image capture device compared to an optical configuration that is parallel to the plane of the image, thereby improving accuracy in generating the three-dimensional profile of the object of interest.

20. The method of claim 18, wherein the Scheimpflug image capture device reduces false depth observations compared to an optical configuration that is parallel to the plane of the image, wherein the false depth observations correspond to measurements in the three-dimensional profile of the object of interest which do not correspond to positions in the scene.

\* \* \* \* \*